(12) United States Patent
Kwon et al.

(10) Patent No.: US 9,281,931 B2
(45) Date of Patent: Mar. 8, 2016

(54) APPARATUS AND METHOD FOR RECEIVING A CONTROL CHANNEL IN A MULTI-COMPONENT CARRIER SYSTEM

(75) Inventors: Ki Bum Kwon, Seoul (KR); Jae Hyun Ahn, Seoul (KR); Sung Kwon Hong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 91 days.

(21) Appl. No.: 14/118,752

(22) PCT Filed: Jun. 15, 2012

(86) PCT No.: PCT/KR2012/004733
§ 371 (c)(1),
(2), (4) Date: Nov. 19, 2013

(87) PCT Pub. No.: WO2012/173424
PCT Pub. Date: Dec. 20, 2012

(65) Prior Publication Data
US 2014/0086224 A1    Mar. 27, 2014

(30) Foreign Application Priority Data
Jun. 16, 2011  (KR) ......................... 10-2011-0058673

(51) Int. Cl.
| | |
|---|---|
| H04J 3/00 | (2006.01) |
| H04L 5/00 | (2006.01) |
| H04W 52/02 | (2009.01) |
| H04W 74/08 | (2009.01) |
| H04W 56/00 | (2009.01) |
| H04W 28/06 | (2009.01) |
| H04W 92/12 | (2009.01) |
| H04L 5/14 | (2006.01) |

(52) U.S. Cl.
CPC .............. *H04L 5/0078* (2013.01); *H04L 5/001* (2013.01); *H04L 5/0053* (2013.01); *H04W 52/0219* (2013.01); *H04W 52/0229* (2013.01); *H04W 56/0045* (2013.01); *H04W 74/0833* (2013.01); *H04L 5/1469* (2013.01); *H04W 28/06* (2013.01); *H04W 92/12* (2013.01)

(58) Field of Classification Search
None
See application file for complete search history.

(56) References Cited

U.S. PATENT DOCUMENTS

| | | | |
|---|---|---|---|
| 8,280,391 B2 * | 10/2012 | Kim et al. ................... | 455/452.1 |
| 2010/0322173 A1 | 12/2010 | Marinier et al. | |
| 2012/0243514 A1 * | 9/2012 | Wu ............................... | 370/336 |

FOREIGN PATENT DOCUMENTS

| | | |
|---|---|---|
| KR | 10-2010-0114852 | 10/2010 |
| KR | 10-2011-0020170 | 3/2011 |

OTHER PUBLICATIONS

International Search Report mailed on Dec. 26, 2012 in PCT Application No. PCT/KR2012/004733.

*Primary Examiner* — Afshawn Towfighi
(74) *Attorney, Agent, or Firm* — H.C. Park & Associates, PLC

(57) ABSTRACT

The present description relates to an apparatus and method for receiving a control channel in a multi-component carrier system. The method for performing random access disclosed in the present description comprises the steps of: transmitting a random access preamble to a base station from an activated sub-serving cell; monitoring physical downlink control channel candidates during a response window one the basis of a certain aggregation in a temporary search space in a control region of the activated sub-serving cell, wherein the control region consists of a group of control channel elements; and adjusting an uplink time of the activated sub-serving cell according to a time advance command indicated by a random access response when the random access response, including a random access identifier corresponding to the random access preamble, is received in the response window.

16 Claims, 15 Drawing Sheets

APPARATUS AND METHOD FOR RECEIVING A CONTROL CHANNEL IN A MULTI-COMPONENT CARRIER SYSTEM

CROSS-REFERENCE TO RELATED APPLICATIONS

This application is the National Stage Entry of International Application PCT/KR2012/004733, filed on Jun. 15, 2012 and claims priority from and the benefit of Korean Patent Application No. 10-2011-0058673, filed on Jun. 16, 2011, which is incorporated herein by reference for all purposes as if fully set forth herein.

BACKGROUND

1. Field

The present invention concerns wireless communication, and more specifically, to an apparatus and method of receiving a control channel in a multi-component carrier system.

2. Discussion of the Background

In a wireless communication system, one base station generally provides a service to multiple user equipments. The base station schedules data for multiple user equipments and transmits data alongside control information on the data. In generally, a channel for carrying control information is referred to as a control channel, and a channel that carries data is referred to as a data channel. A user equipment obtains its control information by monitoring a control channel and processes its data using the control information. Monitoring means a user equipment attempting to decode control channel candidates.

A user equipment should receive control information on its data in order to receive the data. However, in a given bandwidth, control channels of a plurality of user equipments are generally multiplexed in one transmission interval. That is, a base station transmits multiple control channels for multiple user equipments in order to provide a service to the user equipments. Each user equipment discovers its control channel among the multiple control channels. If the user equipment fails to correctly detect its control channel from the multiplexed control channels, the data channel cannot be decoded.

A multi-carrier system means a wireless communication system that may support carrier aggregation. The carrier aggregation is a technology that allows for efficient use of a bandwidth broken to pieces and this technology ties several physically non-contiguous bands in the frequency domain, thereby providing such an effect as if a logically large band is used.

A user equipment undergoes a random access procedure so as to access a network. The random access procedure may be divided into a contention-based random access procedure and a non-contention-based random access procedure. The biggest difference between the contention-based random access procedure and the non-contention-based random access procedure lies in whether a random access preamble is designated to be dedicated to a single user equipment. In the non-contention-based random access procedure, a user equipment uses a dedicated random access preamble that is designated only to the user equipment, and thus, no contention (or collision) with other user equipments arises. Here, the "contention" refers to when two or more user equipments attempt to do a random access procedure using the same random access preamble through the same resource. In the contention-based random access procedure, a user equipment uses an arbitrarily selected random access preamble, and thus, a contention is likely to arise.

A user equipment may perform a random access procedure for the purposes of initial access, handover, request for radio resources (scheduling request), timing alignment, etc.

SUMMARY

An object of the present invention is to provide an apparatus and method of receiving a control channel in a multi-component carrier system.

Another object of the present invention is to provide an apparatus and method of monitoring a control channel indicating a random access response in a multi-component carrier system.

Still another object of the present invention is to provide an apparatus and method of configuring a provisional search space for a secondary serving cell.

According to an aspect of the present invention, a method of receiving a control channel by a user equipment in a multi-component carrier system is provided. The method includes transmitting to a base station a random access preamble on an activated secondary serving cell including a control region configured as a set of control channel elements, monitoring physical downlink control channel candidates in a provisional search space included in the control region at an aggregation level that is a predetermined number of control channel elements in a response window, and if a random access response including a random access identifier corresponding to the random access preamble is received in the response window, adjusting an uplink time of the activated secondary serving cell according to a time advance command indicated by the random access response.

According to another aspect of the present invention, a method of transmitting a control channel by a base station in a multi-component carrier system is provided. The method includes receiving from a user equipment a random access preamble on an activated secondary serving cell including a control region, which consists of a set of control channel elements, configuring a physical downlink control channel indicating a random access response in a provisional search space of the control region in a response window at an aggregation level that is a predetermined number of control channel elements, and transmitting to the user equipment the physical downlink control channel and the random access response.

The random access response may include a time advance command field for adjusting an uplink time of the activated secondary serving cell and a random access identifier corresponding to the random access preamble in the response window.

According to still another aspect of the present invention, a user equipment receiving control information in a multi-component carrier system is provided. The user equipment includes a user equipment transmitting unit that transmits to a base station a random access preamble on an activated secondary serving cell including a control region, which consists of a set of control channel elements, a user equipment receiving unit that monitors physical downlink control channel candidates in a provisional search space included in the control region at an aggregation level that is a predetermined number of control channel elements in a response window, and a random access processing unit that, if the user equipment receiving unit receives a random access response including a random access identifier corresponding to the random access preamble in the response window, adjusts an uplink time of the activated secondary serving cell according to a time advance command indicated by the random access response.

According to yet still another aspect of the present invention, a base station transmitting a control channel in a multi-component carrier system is provided. The base station includes a base station receiving unit that receives from a user equipment a random access preamble on an activated secondary serving cell including a control region, which consists of a set of control channel elements, a random access processing unit that generates a random access response including a time advance command field for adjusting an uplink time of the activated secondary serving cell and a random access identifier corresponding to the random access preamble, and a base station transmitting unit that configures a physical downlink control channel indicating the random access response in a provisional search space of the control region at an aggregation level that is a predetermined number of control channel elements in a response window and transmits the physical downlink control channel and the random access response to the user equipment.

The user equipment may monitor a control channel for controlling a time advance command regarding a secondary serving cell in the control region of the secondary serving cell. Accordingly, the base station may reduce the overhead of the control region of a primary serving cell, and the user equipment may reduce the count of attempting detection according to blind decoding for monitoring a downlink control channel. The consumption of the user equipment's battery may be reduced, and the entire system performance may be enhanced.

DETAILED DESCRIPTION OF THE ILLUSTRATED EMBODIMENTS

Figure 1:
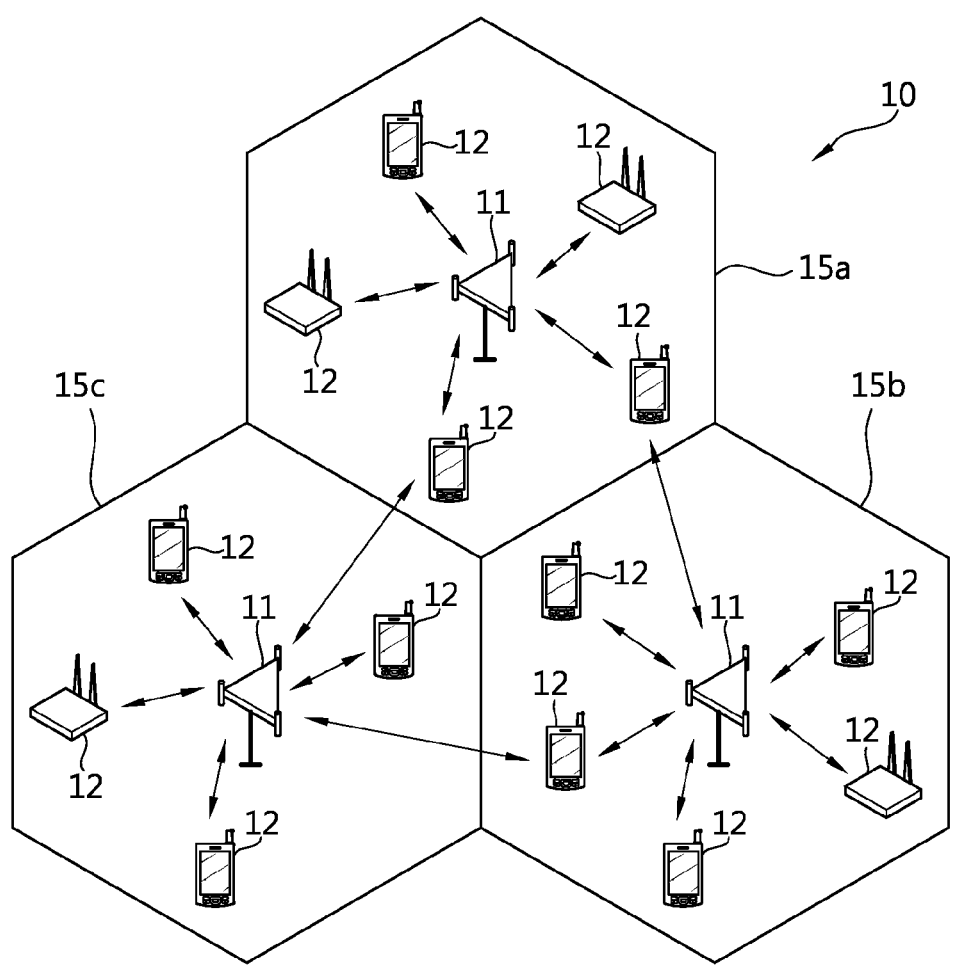
FIG. 1 shows a wireless communication system to which the present invention applies.

Hereinafter, some embodiments of this disclosure will be described in detail with reference to the accompanying drawings. The same reference numeral may be used to denote the same or similar elements throughout the specification and the drawings. When determined to make the subject matter of the present invention unnecessarily unclear, the detailed description of well-known art is skipped.

Further, this disclosure is described, targeting a wireless communication network. A task that is to be achieved in the wireless communication network may be performed when a system (e.g., a base station) in charge of the wireless network controls the network and transmits data or in a user equipment linked to the wireless network.

FIG. 1 shows a wireless communication system to which the present invention applies.

Referring to FIG. 1, the wireless communication system 1 has a spacious arrangement so as to provide various communication services such as voice or packet data. The wireless communication system 10 includes at least one base station (BS) 11. Each base station 11 provides a communication service in a specific cell (15a, 15b, or 15c). A cell may be separated into multiple areas (referred to as sectors).

A user equipment (UE) 12 may be stationary or mobile, and may be also referred to as a mobile station (MS), an MT (mobile user equipment), a UT (user user equipment), an SS (subscriber station), a wireless device, a PDA (personal digital assistant), a wireless modem, a handheld device, etc. The base station 11 may also be referred to as an eNB (evolved-NodeB), a BTS (Base Transceiver System), an access point, a femto base station, a home nodeB, a relay, etc. The cell should be comprehensively construed as a partial area covered by the base station 11 and includes all of a mega cell, a macro cell, a micro cell, a pico cell, a femto cell, and other various coverage areas.

Hereinafter, the downlink refers to communication from the base station 11 to the user equipment 12, and the uplink refers to communication from the user equipment 12 to the base station 11. On downlink, a transmitter may be part of the base station 11, and a receiver may be part of the user equipment 12. On uplink, the transmitter may be part of the user equipment 12, and the receiver may be part of the base station 11. The wireless communication system is not limited as using a specific multiple access scheme. For example, the wireless communication system may adopt various multiple access schemes, such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission may adopt TDD (Time Division Duplex) schemes in which different time periods from each other are used for uplink transmission and downlink transmission or FDD (Frequency Division Duplex) schemes in which different frequencies from each other are used for downlink transmission and uplink transmission.

The carrier aggregation (CA) supports a plurality of carriers and is also referred to as "spectrum aggregation" or "bandwidth aggregation." Individual unit carriers that are tied up by the carrier aggregation are referred to as component carriers (CCs). Each component carrier is defined by a bandwidth and a central frequency. The carrier aggregation has been introduced to support increasing throughput, prevent a cost increase due to the introduction of wideband RF (Radio Frequency) elements, and ensure compatibility with existing systems. For example, if, as a granularity of carrier basis, five component carriers are allocated each having a bandwidth of 20 MHz, up to a bandwidth of 100 MHz may be supported.

The carrier aggregation may be divided into contiguous carrier aggregation that is done between contiguous component carriers in the frequency domain and non-contiguous carrier aggregation that is done between non-contiguous component carriers in the frequency domain. The number of component carriers aggregated for uplink may be set to be different from the number of component carriers aggregated for downlink. When the number of downlink component carriers is the same as the number of uplink component carriers is referred to as symmetric aggregation, and when the number of downlink component carriers is different from the number of uplink component carriers is referred to as asymmetric aggregation.

The magnitudes (i.e., bandwidths) of the component carriers may be different from each other. For example, when five component carriers are used to configure a band of 70 MHz, the configuration may be as follows: a 5 MHz component carrier (CC #0)+a 20 MHz component carrier (CC #1)+a 20 MHz component carrier (CC #2)+a 20 MHz component carrier (CC #3)+a 5 MHz component carrier (CC #4).

Hereinafter, the multi-component carrier system refers to a system that supports carrier aggregation. The multi-component carrier system may use contiguous carrier aggregation and/or non-contiguous carrier aggregation or symmetric carrier aggregation or asymmetric carrier aggregation.

Figure 2:
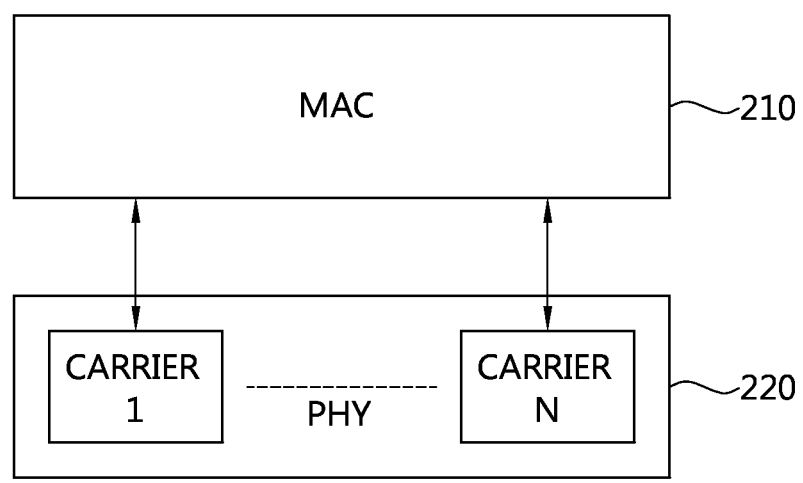
FIG. 2 shows an example of a protocol structure for supporting multiple component carriers to which the reception applies.

FIG. 2 shows an example of a protocol structure for supporting multiple component carriers to which the reception applies.

Referring to FIG. 2, a common MAC (Medium Access Control) entity 210 manages a physical layer 220 that uses a plurality of carriers. An MAC management message that is transmitted over a specific carrier may be applicable to another carrier. That is, the MAC management message is a message that may control other carriers including the specific carrier. The physical layer 220 may operate in TDD (Time Division Duplex) and/or FDD (Frequency Division Duplex).

There are some physical control channels that are used in the physical layer 220. The physical downlink control channel (PDCCH) provides the user equipment with information regarding resource allocation of a PCH (paging channel) and a DL-SCH (downlink shared channel) and HARQ (hybrid automatic repeat request) information related to the DL-SCH. The PDCCH may carry an uplink grant that informs the user equipment of resource allocation of uplink transmission. The PCFICH (physical control format indicator channel) informs the user equipment of the number of OFDM symbols used for PDCCHs and is transmitted every subframe. The PHICH (physical hybrid ARQ indicator channel) is a response to uplink transmission and carries an HARQ ACK/NAK signal. The PUCCH (Physical uplink control channel) carries uplink control information such as an HARQ ACK/NAK, a scheduling request, and a CQI for downlink transmission. The PUSCH (physical uplink shared channel) carries a UL-SCH (uplink shared channel). The PRACH (physical random access channel) carries a random access preamble.

Figure 3:
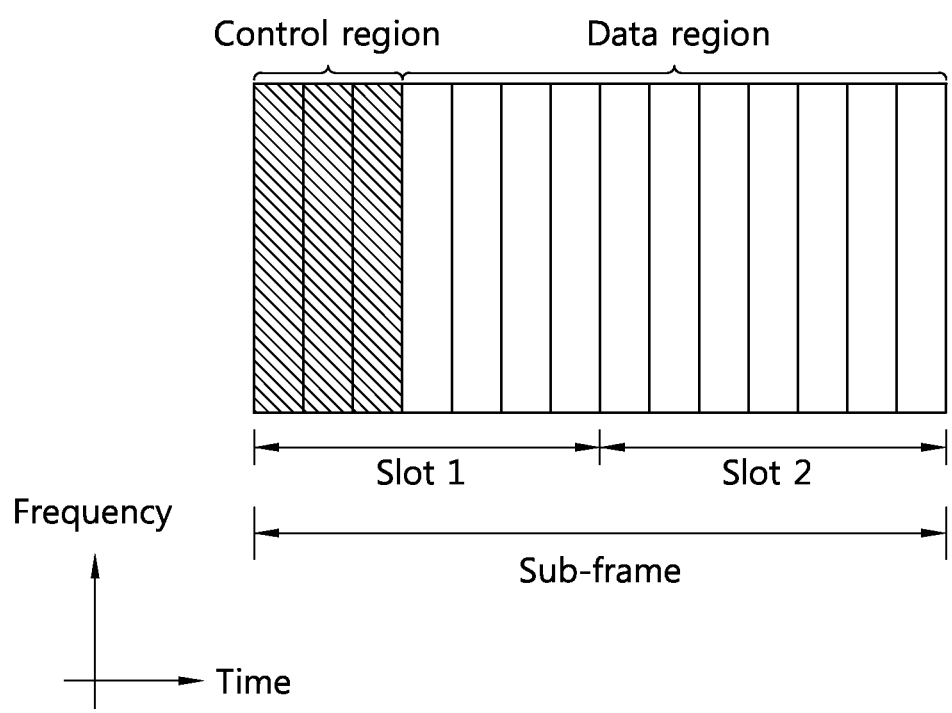
FIG. 3 shows an example of the sub-frame to which the present invention applies.

FIG. 3 shows an example of the sub-frame to which the present invention applies.

Referring to FIG. 3, a sub-frame includes two consecutive slots. The first up to three OFDM symbols in the first slot of the sub-frame are a control region where a PDCCH is allocated, and the remaining OFDM symbols are a data region where a PDSCH is allocated. In addition to the PDCCH, control channels such as a PCFICH or a PHICH may be allocated in the control region. The user equipment decodes control information transmitted through the PDCCH and may read data information transmitted through the PDSCH. Here, the control region having three OFDM symbols is merely an example. The number of OFDM symbols included in the control region of the sub-frame may be known through the PCFICH.

The control region consists of logical multiple CCEs (control channel elements). Here, a CCE row is a set of all the CCEs constituting a control region in one sub-frame. The CCE corresponds to a plurality of resource element groups. For example, the CCE may correspond to nine resource element groups. The resource element group is used for defining mapping a control channel to a resource element. Fe, one resource element group may consist of four resource elements.

A plurality of PDCCHs may be transmitted in the control region. The PDCCH carries control information such as scheduling allocation. The PDCCH is transmitted over one CCE (control channel element) or the aggregation of some contiguous CCEs. Depending on the number of CCEs constituting a CCE aggregation level, the format and possible bit count of the PDCCH are determined. Hereinafter, the number of CCEs used for transmitting a PDCCH is referred to as a CCE aggregation level. Further, the CCE aggregation level is a CCE level for searching a PDCCH. The size of a CCE aggregation level is defined as the number of CCEs contiguous to each other. For example, a CCE aggregation level may be elements of {1, 2, 4, 8}.

The following table represents an example of possible bit counts and formats of a PDCCH depending on CCE aggregation levels.

TABLE 1

| PDCCH format | CCE aggregation level | Number of resource element groups | Bit count of PDCCH |
|---|---|---|---|
| 0 | 1 | 9 | 72 |
| 1 | 2 | 18 | 144 |
| 2 | 4 | 36 | 288 |
| 3 | 8 | 72 | 576 |

Control information transmitted through a PDCCH is referred to as downlink control information (hereinafter, DCI). The DCI transmits uplink or downlink scheduling information or uplink power control command, control information for paging, and control information for indicating a random access (RA) response. The DCI has the following formats: format 0 for PUSCH scheduling, format 1 for scheduling one PDSCH codeword, format 1A for compact scheduling of one PDSCH codeword, format 1C for very compact scheduling of a DL-SCH, format 2 for PDSCH scheduling in a closed-loop spatial multiplexing mode, format 2A for PDSCH scheduling in an open-loop spatial multiplexing mode, and formats 3 and 3A for transmission a TPC (Transmission Power Control) command for an uplink channel.

Figure 4:
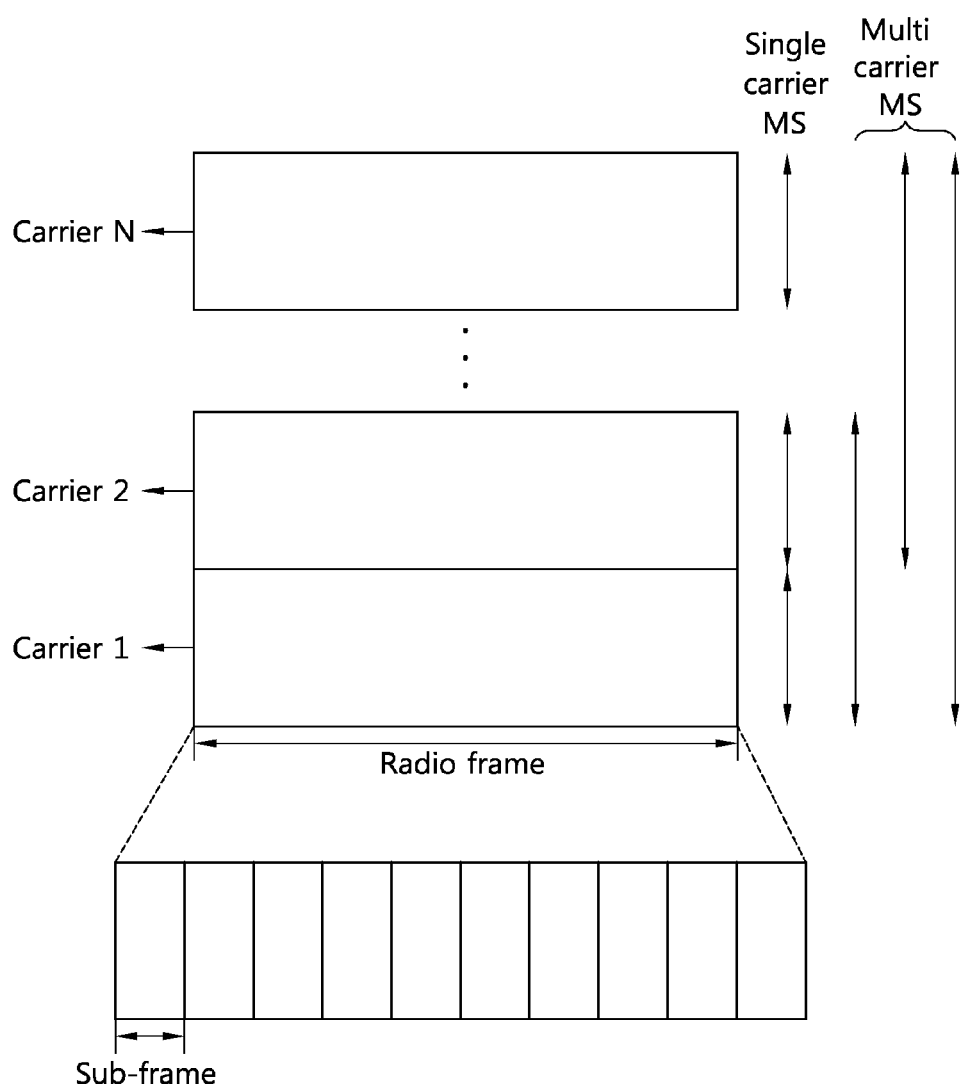
FIG. 4 shows an example of a frame structure for a multi-component carrier operation to which the present invention applies.

FIG. 4 shows an example of a frame structure for a multi-component carrier operation to which the present invention applies.

Referring to FIG. 4, a frame consists of 10 sub-frames. Each component carrier may carry its own control channels (e.g., PDCCH). The user equipment may support one or more component carriers at its capacity. Here, in order to indicate an area where control information (PDCCH) is transmitted through the downlink component carrier, the PCFICH matches the first one of the plurality of OFDM symbols.

Figure 5:
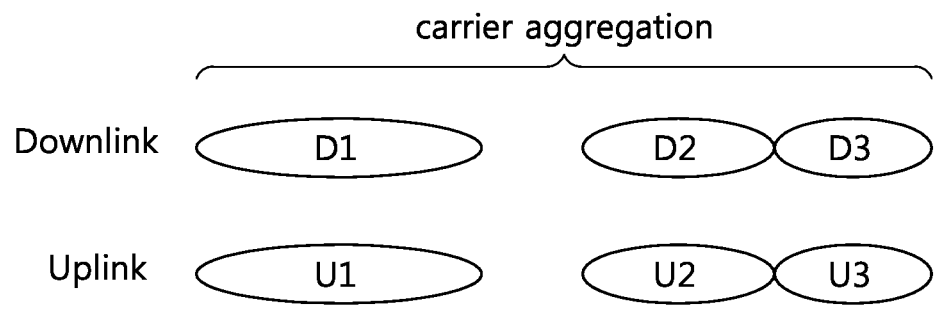
FIG. 5 shows the linkage between a downlink component carrier and an uplink component carrier in a multi-component carrier system to which the present invention applies.

FIG. 5 shows the linkage between a downlink component carrier and an uplink component carrier in a multi-component carrier system to which the present invention applies.

Referring to FIG. 5, by way of example, downlink component carriers D1, D2, and D3 are aggregated, and uplink component carriers U1, U2, and U3 are aggregated. Here, Di is an index of a downlink component carrier, and Ui is an index of an uplink component carrier (i=1, 2, 3). At least one downlink component carrier is a primary component carrier, and the others are secondary component carriers. Each index does not conform to the order of a component carrier or the frequency band of a corresponding component carrier.

Meanwhile, at least one uplink component carrier is a primary component carrier, and the others may be set as secondary component carriers. Further, at least one uplink component carrier may be set as a primary component carrier, and the others may be set as secondary component carriers. For example, D1 and U1 are primary component carriers, and D2, U2, D3, and U3 are secondary component carriers.

Here, the index of the primary component carrier may be set as 0, and one of the other natural numbers may be the index of a secondary component carrier. Further, the index of a downlink/uplink component carrier may be set to be the same as the index of a component carrier (or serving cell) in which the downlink/uplink component carrier is included. As another example, the component carrier index or secondary component carrier index only is configured, while there is no uplink/uplink component carrier index included in the corresponding component carrier.

In an FDD system, a downlink component carrier and an uplink component carrier may be configured to be connected in a one to one manner. For example, D1, D2, and D3, respectively, are configured to be connected to U1, U2, and U3, in a one to one manner. The user equipment configures connections between downlink component carriers and uplink component carriers through system information transmitted through a logical channel BCCH or a user equipment-dedicated RRC message transmitted through a DCCH. Such connections are referred to as SIB1 system information block 1) connections or SIB2 (system information block 2) connections. Each connection may be configured cell-specifically or user equipment-specifically (or UE-specifically). By way of example, a primary component carrier is connection configured cell-specifically, and a secondary component carrier may be connection configured UE-specifically. Here, the downlink component carriers and the uplink component carriers may be connected not only in a one to one manner but also in a one to n or n to one manner.

The primary serving cell means one serving cell that provides a security input and NAS mobility information under the RRC established or re-established state. Depending on the capabilities of the user equipment, at least one cell, along with the primary serving cell, may be configured to form a set of serving cells, and the at least one cell is referred to as a secondary serving cell. A serving cell set configured for one user equipment consists of only one primary serving cell or may consist of one primary serving cell and at least one secondary serving cell.

The downlink component carrier corresponding to a primary serving cell is referred to as a downlink primary component carrier (DL PCC), and the uplink component carrier corresponding to a primary serving cell is referred to as an uplink primary component carrier (UL PCC). Further, on downlink, the component carrier corresponding to a secondary serving cell is referred to as a downlink secondary component carrier (DL SCC), and on uplink, the component carrier corresponding to a secondary serving cell is referred to as an uplink secondary component carrier (UL SCC). Only one downlink component carrier may correspond to one serving cell, and a DL CC and a UL CC both may correspond to the serving cell.

In the multi-component carrier system, the communication between the user equipment and the base station being achieved through a DL CC or a UL CC is equivalent in concept to the communication between the user equipment and the base station being achieved through a serving cell. For example, in a method of performing random access according to the present invention, the user equipment transmitting a preamble using a UL CC may be considered to be equivalent in concept to transmitting a preamble using a primary serving cell or secondary serving cell. Further, the user equipment receiving downlink information using a DL CC may be deemed equivalent in concept to receiving downlink information using a primary serving cell or secondary serving cell.

The primary serving cell and the secondary serving cell have the following characteristics.

First, the primary serving cell is used for transmitting a PUCCH. In contrast, the secondary serving cell cannot transmit a PUCCH but may transmit some control information in the PUCCH through a PUSCH.

Second, the primary serving cell always remains activated, whereas the secondary serving cell is a carrier that switches between activation and deactivation depending on specific conditions. The specific conditions may include receiving an activation/deactivation MAC control component message of the base station or expiration of the deactivation timer in the user equipment.

Third, when the primary serving cell experiences a radio link failure (hereinafter, "RLF"), an RRC reestablishment is triggered, while when the secondary serving cell goes through an RLF, no RRC reestablishment is triggered. The radio link failure occurs when downlink capability is kept lower than a threshold for a predetermined time or more or when an RACH fails a number of times which is not less than a threshold.

Fourth, the primary serving cell may be varied by changing a security key or by a handover procedure that comes alongside the RACH procedure. However, in the case of a CR (contention resolution) message, the PDCCH indicating the CR, only, should be transmitted through the primary serving cell, and the CR information may be transmitted through the primary serving cell or secondary serving cell.

Fifth, NAS (non-access stratum) information is received through the primary serving cell.

Sixth, in the primary serving cell, a DL PCC and a UL PCC are always configured in pair.

Seventh, procedures such as reconfiguration, addition and removal of the secondary serving cell may be performed by a radio resource control (RRC) layer. In adding a new serving cell, RRC signaling may be used for transmitting system information of a dedicated secondary serving cell.

Eighth, procedures such as reconfiguration, addition and removal of the secondary serving cell may be performed by a radio resource control (RRC) layer. In adding a new serving cell, RRC signaling may be used for transmitting system information of a dedicated secondary serving cell.

Ninth, the primary serving cell may provide both a PDCCH (for example, downlink allocation information or uplink grant information) allocated to a UE-specific search space configured to transmit a control channel to only a specific user equipment in the area where control information is transmitted and a PDCCH (for example, system information (SI), random access response (RAR), transmit power control (TPC)) allocated to a common search space configured to transmit control information to multiple user equipments that satisfy a specific condition or all the user equipments in the cell.

The technical spirit of the present invention regarding the characteristics of the primary serving cell and the secondary serving cell are not essentially limited to what has been described above, which is merely an example, and more examples may be included therein.

In a wireless communication environment, a propagation delay occurs while an RF signal is transmitted from a transmitter to a receiver. Accordingly, although the transmitter and the receiver both are exactly aware of the time when the RF signal is transmitted from the transmitter, the time when the signal arrives at the receiver is influenced by the distance between the transmitter and the receiver or ambient propagation environments, and in case the receiver moves on, the arrival time is changed. In case the receiver cannot be exactly aware of the time when the signal transmitted from the transmitter is received by the receiver, the receiver fails to receive the signal, or even if succeeding, happens to receive a distorted signal, thus rendering it impossible to communicate.

Accordingly, in a wireless communication system, sync between the base station and the user equipment should be first achieved on downlink/uplink, whichever, in order to receive an information signal. There are various types of sync, such as frame sync, information symbol sync, sampling period sync, etc. The sampling period sync should be most basically achieved in order to differentiate physical signals from each other.

Downlink sync is performed by the user equipment based on a signal from the base station. The base station transmits a specific signal mutually promised for the user equipment to easily perform downlink sync. The user equipment should be exactly aware of the time when the specific signal has been transmitted from the base station. In case of downlink, one base station sends out the same sync signal to multiple user equipments at the same time, the user equipments each may independently obtain sync.

In case of uplink, a base station receives signals from multiple user equipments. In case the distance between each user equipment and the base station is different, the signals received by the base station have different transmission delay times, respectively, and in case uplink information is transmitted based on each obtained downlink sync, information from each user equipment is received by the base station at different times. In such case, the base station cannot obtain sync based on any one user equipment. Accordingly, obtaining uplink sync requires a procedure different from that of downlink.

Meanwhile, obtaining uplink sync may have a different need for each multiple access scheme. For example, in case of a CDMA system, even when a base station receives uplink signals from user equipments at different times, the base station may separate tie uplink signals from each other. However, in a wireless communication system based on OFDMA or FDMA, a base station simultaneously receives uplink signals from all the user equipments and demodulates the received signals at the same time. Accordingly, as uplink signals are received from multiple user equipments at a more precise time, the performance of reception increases, and as a difference in reception time between the user equipments increased, the reception performance may sharply decrease. Therefore, obtaining uplink sync may be inevitable.

The random access procedure is performed in order to obtain uplink sync, and the user equipment obtains uplink sync by adjusting an uplink time based on a time alignment value (TAV) transmitted from the base station. In light of having a value that puts an uplink time forward, the time alignment value may be called a timing advance value. Or, the time alignment value may also be referred to as a timing adjustment value.

A predetermined time after uplink sync is obtained based on the time alignment value, it needs to be determined whether the obtained uplink sync is valid. For this, the user equipment defines a time alignment timer (TAT) that may be configured by the base station. If the time alignment timer is in operation, the user equipment and the base station are now in the state where uplink sync has been achieved therebetween. If the time alignment timer expires or is not in operation, the user equipment and the base station are considered to be not left in synchronization with each other, and a procedure for obtaining uplink sync should be started. In such case, the user equipment does not perform uplink transmission except transmission of random access preamble. Specifically, the time alignment timer operates as follows:

i) In case the user equipment receives a time advance command through an MAC control element from the base station, the user equipment applies a time alignment value indicated by the received time advance command to uplink sync. The user equipment starts or restarts the time alignment timer.

ii) In case the user equipment receives a time advance command through a random access response message from the base station, if the user equipment's MAC layer didn't select the random access response message (a), the user equipment applies the time alignment value indicated by the time advance command to the uplink sync and starts or restarts the time alignment timer. Or, in case the user equipment receives a time advance command through a random access response message from the base station, if the user equipment's MAC layer selects the random access response message and the time alignment timer is not in operation (b), the user equipment applies the time alignment value indicated by the time advance command to the uplink sync and starts the time alignment timer, and if failing a contention solution that is a subsequent random access step, it stops the time alignment timer. Or, in a case other than (a) and (b), the user equipment disregards the time advance command.

iii) If the time alignment timer expires, the user equipment flushes data stored in all the HARQ buffers. The user equipment informs a release of PUCCH/SRS to the RRC layer. At this time, a type 0 SRS (periodic SRS) is released, and a type 1 SRS (aperiodic SRS) is not released. The user equipment initializes (clears) all the configured downlink and uplink resource allocations.

In order to transmit an uplink signal except for a random access preamble, the user equipment should obtain a valid time alignment value for a UL CC corresponding to a corresponding serving cell. If the valid time alignment value for the UL CC is obtained, the user equipment may periodically or aperiodically transmit an uplink signal such as a sounding reference signal (SRS) on the UL CC. The SRS is a basis for the base station to update the time alignment value. The base station may identify, in real-time, whether the time alignment value obtained for the UL CC is valid or needs to be updated from the uplink signal.

If uplink sync is broken, the user equipment should newly obtain a time alignment value, and the time alignment value may be transmitted to the user equipment through an MAC message. By way of example, the MAC message includes a random access response (RAR). Control information regarding the random access response is transmitted through a PDCCH that is a control channel. If decoding the PDCCH fails, the user equipment cannot be aware of the PDCCH, and ends up being not able to successfully receive a random access response indicated by the PDCCH. Accordingly, in order to obtain a time alignment value for uplink sync, the user equipment should first succeed to decode the PDCCH.

Since in a multi-component carrier system, time alignment should be achieved between multiple serving cells, a random access procedure is performed per serving cell. If PDCCHs for random access responses of all the serving cells are intensively transmitted only in a primary serving cell, a limited radio resource allocated to the control region may be sharply saturated. Further, if the number of PDCCH candidates that should be monitored by the user equipment increases, the user equipment has more burden in blind decoding so that the battery lifespan of the user equipment may be shortened.

Blind decoding is to attempt to restore a control channel using various combinations of information while the user equipment does not have information necessary for restoring the control channel. That is, the user equipment is not aware of whether control channels transmitted from the base station are the ones for the user equipment, and the user equipment decodes all the given control channels until the user equipment finds its control channels while the user equipment is not aware of where the user equipment's control channels are positioned. The user equipment may use its unique information in order to determine whether a control channel is the user equipment's control channel. For example, when the base station multiplexes a control channel of each user equipment, the base station may scramble a unique identifier of each user equipment to a CRC (Cyclic Redundancy Check) and transmit the scrambled unique identifier. The CRC is a code used for error detection. The user equipment, after descrambling its unique identifier from the CRC of the received control channel, performs a CRC check to determine whether the control channel is the user equipment's control channel. In order to reduce the burden of blind decoding, a need exists for an apparatus and method of efficiently monitoring and receiving a control channel in a multi-component carrier system.

Figure 6:
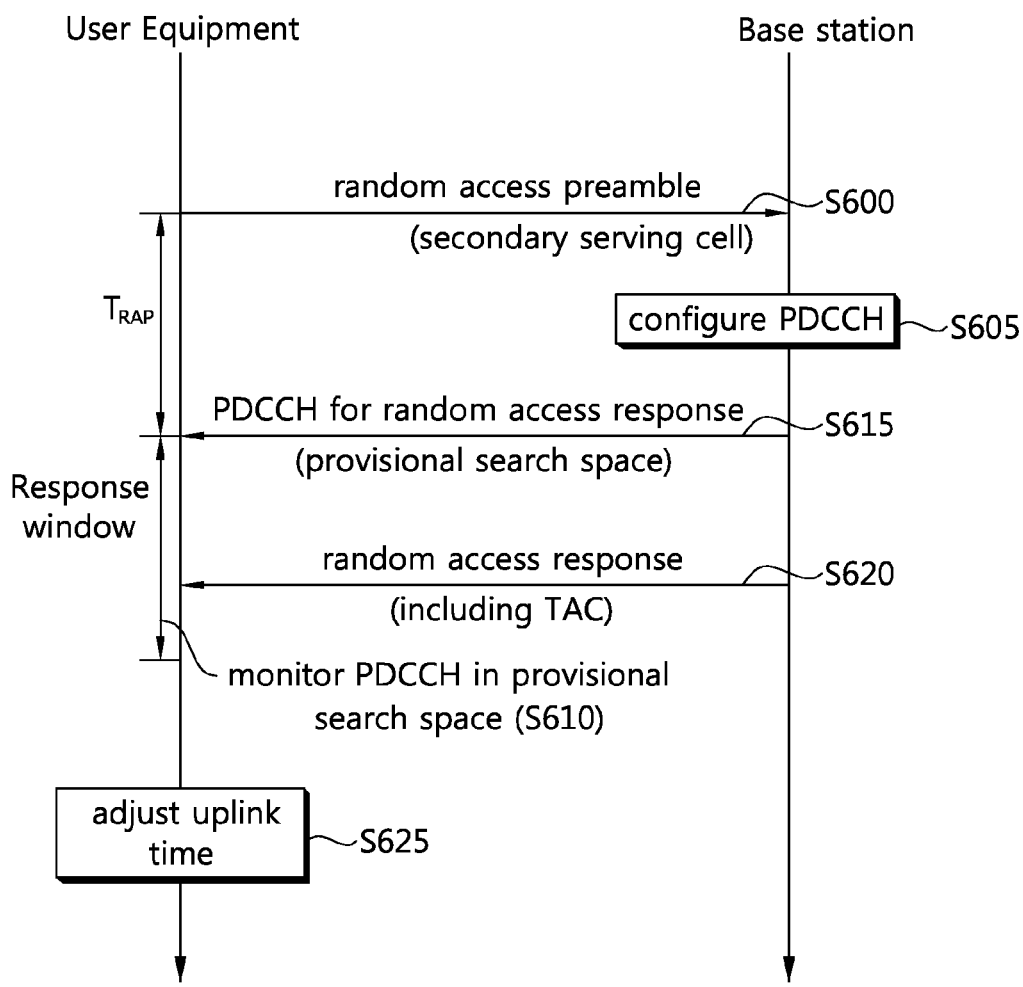
FIG. 6 is a flowchart illustrating a method of receiving a control channel in a multi-component carrier system according to an embodiment of the present invention.

FIG. 6 is a flowchart illustrating a method of receiving a control channel in a multi-component carrier system according to an embodiment of the present invention.

Referring to FIG. 6, the user equipment transmits a random access preamble to the base station on a secondary serving cell (S600). The secondary serving cell may be in an activated state. The random access preamble may be determined by the base station according to non-contention based random access or may be randomly obtained by the user equipment according to contention-based random access. For example, in the case of non-contention random access, the base station selects one of dedicated random access preambles previously reserved for a specific secondary serving cell for a non-contention based random access procedure among all the available random access preambles and transmits, to the user equipment, preamble allocation (RA) information including usable time/frequency resource information and an index of the selected random access preamble. Then, the user equipment transmits a random access preamble designated according to preamble allocation information to the base station on the secondary serving cell. The preamble allocation information and the index of the random access preamble may be transmitted from the base station to the user equipment through a PDCCH command that is an L1 message or through an RRC message.

The base station configures a PDCCH (S605). A method of configuring a PDCCH by the base station will be described in detail with reference to FIG. 9.

The user equipment monitors a PDCCH for a random access response in a provisional search space (PSS) for a time corresponding to a response window when a TRAP passes after the random access preamble has been transmitted (S610). Here, the PDCCH for the random access response means an RA-RNTI-scrambled PDCCH.

The provisional search space is a space that is monitored by the user equipment to receive a random access response and is a search space provisionally configured in the control region of a secondary serving cell.

In the control region of a secondary serving cell, a provisional search space and a user equipment-specific search space both or only the user equipment-specific search space from time to time may be configured. The unit for CCE aggregation in the provisional search space is 4 or 8 like the common search space (CSS). In order not to put more burden in the user equipment decoding a PDCCH and an overhead in a secondary serving cell, in case there is a random access responding procedure in the secondary serving cell, a provisional search space may be configured in the control region of the secondary serving cell. That is, the base station provisionally configures a provisional search space in the control region of the secondary serving cell in a response window. In a time except for the response window, no provisional search space exists.

Figure 7:
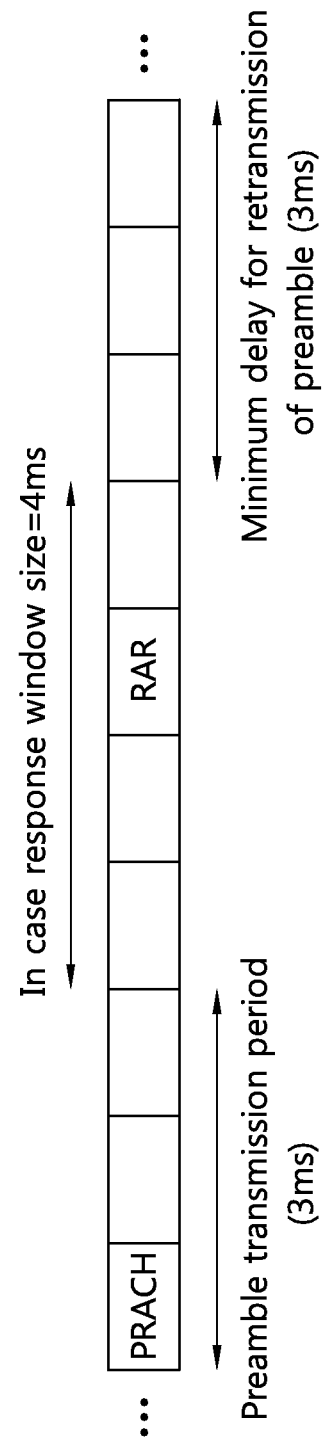
FIG. 7 is a view illustrating an example of a process of monitoring a PDCCH for a random access response according to the present invention.

The response window is a time period during which the user equipment monitors a PDCCH for random access response in a secondary serving cell and its size may be 4 ms as shown in FIG. 7. As shown in FIG. 7, the times of the random access procedure may include a preamble transmission period, a response window, and a minimum delay for retransmission of a preamble.

The period during which the user equipment monitors a PDCCH for random access response in a provisional search space in the control region of a secondary serving cell is the response window. In other words, the user equipment does not perform PDCCH monitoring in a secondary serving cell for a time except the response window period. The detailed description will be given below with reference to FIG. 8.

Referring back to FIG. 6, the base station transmits a PDCCH for random access response on a secondary serving cell (S615). At this time, the PDCCH for random access response is configured in a provisional search space of the secondary serving cell. The base station transmits a random access response indicated by the PDCCH to the user equipment (S620). Then, the user equipment receives the random access response using the PDCCH. The random access response is transmitted through the data region of a DL CC corresponding to the secondary serving cell where a random access preamble has been transmitted or the data region of the secondary serving cell having a provisional search space or the data region of a primary serving cell. In particular, the random access response is transmitted to the user equipment through a PDSCH. The random access response includes a time advance command (TAC) field. The time advance command field indicates a change in a relative uplink time with respect to the current uplink time and may be an integer multiple of a sampling time (Ts), for example, 16 Ts. That is, the time advance command field indicates a time alignment value updated with respect to a secondary serving cell. The updated time alignment value may be given as a specific index.

The user equipment adjusts a uplink time based on the updated time alignment value (S625). By way of example, the user equipment may calculate a time (TA) that is to be adjusted using a time alignment value (NTA) provided from the base station and may adjust the uplink time. The adjusted uplink time (TA) may be obtained from the following Equation 1:

$$TA = (N_{TA} + N_{TA\ offset}) \times T_s \quad \text{[Equation 1]}$$

Here, $N_{TA}$ is a timing offset between an uplink radio frame and a downlink radio frame in the user equipment and is denoted in $T_s$. $N_{TA}$ is variably controlled by a time advance command of the base station, and $N_{TA\ offset}$ is a value fixed by a frame structure. $T_s$ is a sampling period.

Meanwhile, a previous timing offset ($N_{TA\text{-}old}$) is adjusted to a new timing offset ($N_{TA\text{-}new}$) by a time alignment value ($T_i$) and $N_{TA\text{-}new}$ may be obtained from the following Equation 2:

$$N_{TA\text{-}new} = N_{TA\text{-}old} + (T_i - 31) \times 16 \quad \text{[Equation 2]}$$

Referring to Equation 2, $T_i$ is an index value, which is 0, 1, 2, ..., or 63. That is, $T_i$ may be represented in six bits, and this is indicated by the time advance command field. Here, if $N_{TA}$ is positive (+), this denotes that adjustment is performed to advance the uplink time, and if $N_{TA}$ is negative (-), this denotes that adjustment is performed to delay the uplink time. That is, the time advance command field indicates a time alignment value that is a relative change in an uplink time with respect to a previous uplink time.

As another example, the time (TA) to be adjusted may be calculated by a time alignment value regarding a secondary serving cell that is obtained based on a time alignment value regarding a primary serving cell.

Figure 8:
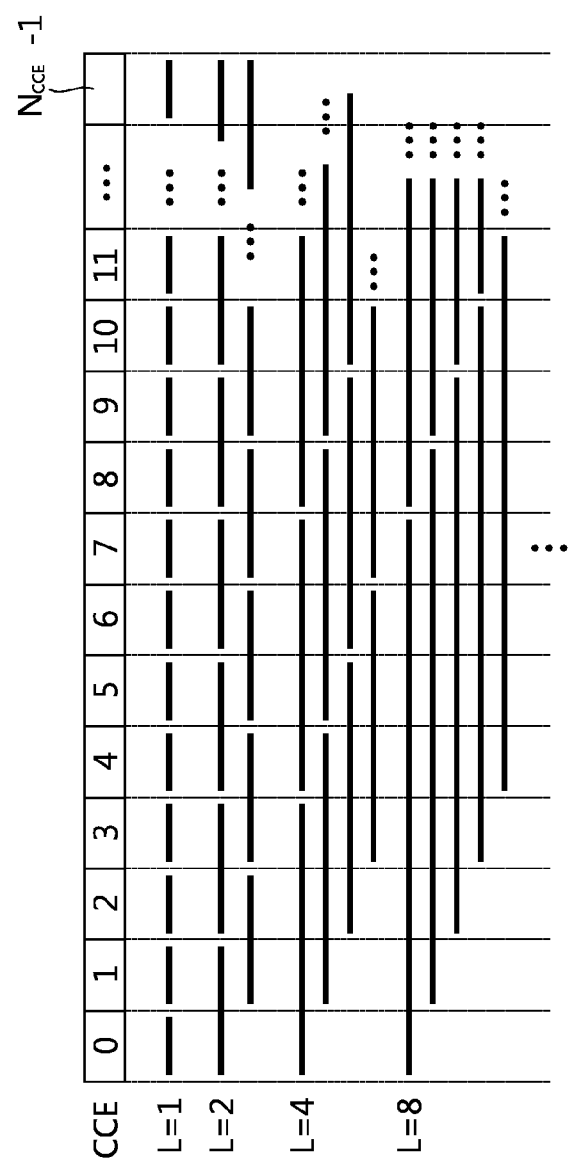
FIG. 8 is a view illustrating an example of a process of monitoring a provisional search space by a user equipment according to the present invention.

FIG. 8 is a view illustrating an example of a process of monitoring a provisional search space by a user equipment according to the present invention. Hereinafter, a specific range in a CCE row is defined as a search space. The search space is a space for searching a PDCCH in a logical CCE row. A set of PDCCH candidates to be monitored is defined according to a search space. The search space is a set of CCEs contiguous to a specific starting point (starting location) in a CCE row according to the unit of aggregation. Each search space is defined per CCE aggregation level. The locations of PDCCH candidates arise independently in a search space per CCE aggregation level. That is, the specific starting point where a PDCCH may be positioned may vary per CCE aggregation level.

Control information carried on a PDCCH may be separated into common control information that is received by all of the user equipments in a cell and user equipment-specific control information that is received by a specific user equipment in the cell. The base station multiplexes the common control information and user equipment-specific control information for multiple user equipments and transmits the multiplexed control information. Accordingly, search spaces may be a common search space for the common control information and a user equipment-specific (UE-specific) search space for the user equipment-specific control information.

A PDCCH that carries common control information is allocated to the common search space. The user equipment may reduce the detection attempt count by attempting to do blind decoding on a set of PDCCH candidates that carry common control information only in the common search space. The common control information includes control information for a paging message, control information for system information, control information for varying system information, and control information for random access response. An RNTI (Radio Network Temporary Identifier) for each common control information may be scrambled in the CRC of the common control information. For example, a P-RNTI (Paging-RNTI), an SI-RNTI (System Information-RNTI), or an RA-RNTI (Random Access-RNTI) may be scrambled depending on each common control information.

In the case of a user equipment-specific PDCCH, the user equipment's unique identifier, for example, C-RNTI (Cell-RNTI), may be scrambled in the CRC. Or, in the case of a PDCCH for a paging message transmitted through a PCH, a P-RNTI, which is a paging identifier, may be scrambled in the CRC. In the case of a PDCCH for system information transmitted through a DL-SCH, an SI-RNTI that is a system information identifier may be scrambled in the CRC. In the case of a PDCCH for indicating a random access response that is a response to the user equipment's transmission of a random access preamble, an RA-RNTI may be scrambled in the CRC. The following table shows examples of identifiers scrambled in a PDCCH.

TABLE 2

| Type | Identifier | Details |
| --- | --- | --- |
| UE-specific | C-RNTI | Used for identifying a unique user equipment |
| Common | P-RNTI | Used for paging message |
|  | SI-RNTI | Used for system information |
|  | RA-RNTI | Used for random access response |

As another example, a PDCCH in which a C-RNTI that is a PDCCH for a specific user equipment is scrambled in the CRC in a common search space may be transmitted as well. This is to allow as many PDCCHs as possible to be transmitted depending on the scheduling policy of the base station, like when no more user equipment-specific search space may be allocated when the base station transmits the PDCCH but it is determined that there is a room in the common search space.

The common search space may be different or the same per sub-frame. The start point of a common search space is the same for all the user equipments in a cell. That is, the starting point of a common search space is fixed for all the user equipments in a cell. The starting point of a common search space may be the same for all the cells. Or, for randomization of inter-cell interference, different common search space starting points from each other may be set for each cell. The starting point of a common search space may be previously set between the base station and the user equipment or may be informed from the base station to the user equipment through RRC signaling or system information.

A PDCCH that carries user equipment-specific control information is allocated in a user equipment-specific search space. The user equipment may reduce the detection attempting count by trying to do blind decoding on a set of PDCCH candidates that carry user equipment-specific control information only in the user equipment-specific search space. For this, the user equipment discovers a starting point of a user equipment-specific search space and attempts to perform blind decoding on a set of PDCCH candidates that carry user equipment-specific control information from the starting point. The starting point of a user equipment-specific search space may be different per user equipment, per sub-frame, or per CCE aggregation level.

The user equipment-specific control information includes downlink scheduling allocation information and uplink scheduling allocation information on a specific user equipment. The user equipment-specific control information allocated in a user equipment-specific search space may be limited to user equipment-specific control information with a relatively long information payload. The downlink scheduling allocation or uplink scheduling allocation for an SIMO (Single Input Multiple Output)/MIMO (Multiple Input Multiple Output operation has a semi-static variation in the length of payload. Accordingly, in the user equipment-specific search space of a sub-frame, blind decoding is conducted to fit the payload format that corresponds to a transmission mode used for the corresponding sub-frame. A C-RNTI may be scrambled in the CRC of user equipment-specific control information.

In order to discover the starting point of a user equipment-specific search space, the user equipment may implement a hashing function. The hashing function is a function for designating the starting point of a user equipment-specific search space. The hashing function may use, as its inputs, a user equipment ID (Identifier), a CCE aggregation level, a sub-frame number, the number of available CCEs of the corresponding sub-frame, or a specific constant. Hereinafter, the number of available CCEs of a corresponding sub-frame means the number of CCEs constituting a logical CCE row. The hashing function may output the starting point of a user equipment-specific search space as a CCE index number on a CCE set.

As such, the common search space is a search space that is monitored by all the user equipments in a cell, and the user equipment-specific search space is a search space that is monitored by a specific user equipment. The user equipment monitors the common search space and the user equipment-specific search space both. The common search space may overlap the user equipment-specific search space.

Referring to FIG. 8, the total number of CCEs in a sub-frame is NCCE. That is, CCE indexes exist from 0 to NCCE–1. The CCE aggregation level (L) is {1,2,4,8}, i.e., four types. In case the CCE aggregation level is 1, the user equipment may perform blind decoding in all the CCE indexes. Also in case the CCE aggregation level is 2, 4, or 8, the user equipment may do blind decoding in all the CCE indexes. That is, the user equipment may conduct blind decoding in all the CCE indexes at the given CCE aggregation level. Further, the user equipment attempts to do blind decoding on all the DCI formats. Unlike in the common search space where blind decoding is attempted on all of the C-RNTI, P-RNTI, SI-RNTI, and RA-RNTI, the user equipment attempts to do blind decoding only on the RA-RNTI in the provisional search space.

The user equipment obtains a logical CCE row by demapping physical resource elements constituting a provisional search space with a CCE—CCE to RE demapping—in the control region of one sub-frame on a secondary serving cell. The user equipment monitors PDCCHs in the CCE row. This is why the base station does not provide the user equipment with any information on where in the CCE row a corresponding PDCCH is mapped. The user equipment discovers its PDCCH by monitoring a set of PDCCH candidates in the CCE row. For example, when discovering no errors by performing CRC check after descrambling its RA-RNTI in a corresponding PDCCH, the user equipment detects it as its PDCCH.

The user equipment which is in an active mode monitors a set of PDCCH candidates per sub-frame in the response window in order to receive a random access response transmitted thereto. When in a DRX mode, the user equipment wakes up in the monitoring period every DRX period and monitors a set of PDCCH candidates in the sub-frame corresponding to the monitoring period. The sub-frame where PDCCH monitoring is conducted is referred to as a non-DRX sub-frame or PDCCH sub-frame.

As such, the user equipment should perform blind decoding on all the CCEs of the non-DRX sub-frame in order to receive the PDCCH transmitted thereto. Because of being not aware of which PDCCH format is transmitted, the user equipment should decode all the PDCCHs at a possible CCE aggregation level until blind decoding of a PDCCH in each non-DRX sub-frame succeeds.

Figure 9:
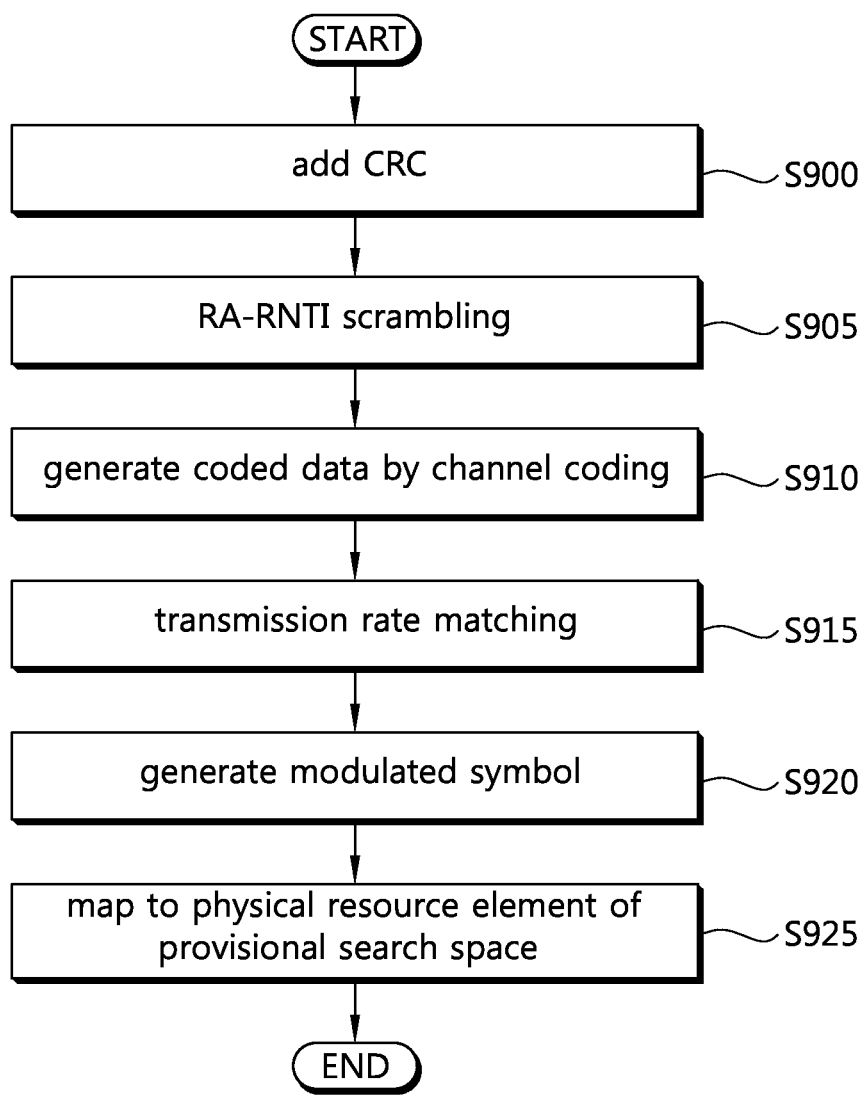
FIG. 9 is a flowchart illustrating a method of configuring a PDCCH indicating a random access response by a base station to which the present invention applies.

FIG. 9 is a flowchart illustrating a method of configuring a PDCCH indicating a random access response by a base station to which the present invention applies.

Referring to FIG. 9, when receiving a random access preamble, the base station adds a CRC (Cyclic Redundancy Check) for error detection to a DCI that is to be sent to the user equipment (S900). The base station scrambles an identifier (which is referred to as an RA-RNTI) indicating a random access response to a specific user equipment into the CRC (S905). By doing so, the base station may generate a PDCCH. The base station may identify or specify an RA-RNTI using a random access preamble. The DCI added with the CRC scrambled with the RA-RNTI is shortly referred to as RA-RNTI-scrambled DCI. The PDCCH generated with the DCI added with the RA-RNTI-scrambled CRC is referred to as RA-RNTI-scrambled PDCHC.

The base station performs channel coding on the RA-RNTI-scrambled DCI or RA-RNTI-scrambled PDCCH, thereby to generate coded data (S910). The DCI may include, as format 1A, the fields shown in Table 3:

TABLE 3

Carrier indicator field (CIF) - 0 or 3 bits.
flag for identifying format 0/1A - 1 bit (0 indicates format 0, 1 indicates format 1A) in case format 1A CRC is scrambled by C-RNTI, and the remaining fields are set as below, format 1A is used for a random access procedure that is initiated by a PDCCH command.
below-
localized/distributed VRB allocation flag - 1 bit. Set as 0- resource block allocation - $\lceil \log_2(N_{RB}^{DL}(N_{RB}^{DL} + 1)/2) \rceil$ bits. All bits are set as 1's.
Preamble Index - 6 bits
PRACH Mask Index- 4 bits
all the remaining bits of format 1A for simple scheduling allocation of one PDSCH codeword are set as 0's.

Referring to Table 3, the preamble index is an index that indicates one preamble selected from dedicated random access preambles previously reserved for a non-contention based random access procedure, and the PRACH mask index is usable time/frequency resource information. The usable time/frequency resource information may indicate different resources by PRACH configuration information that is configured differently for each cell as shown in Table 4 (FDD) and Table 5 (TDD). In Table 4 or 5, the PRACH configuration information index is transmitted to all the user equipments in a cell through a broadcasting channel or an RRC message.

TABLE 4

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

TABLE 5

| PRACH configuration Index | Preamble Format | Density Per 10 ms $D_{RA}$ | Version $r_{RA}$ |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

The usable time/frequency resource information, despite the same PRACH mask index value, indicates different resources, depending on a frequency division duplex (FDD) system and a time division duplex (TDD) system as shown in Table 6.

TABLE 6

| PRACH mask index | allowed PRACH (FDD) | Non-allowed PRACH (TDD) |
|---|---|---|
| 0 | All | All |
| 1 | PRACH resource index0 | PRACH resource index0 |
| 2 | PRACH resource index1 | PRACH resource index1 |
| 3 | PRACH resource index2 | PRACH resource index2 |
| 4 | PRACH resource index3 | PRACH resource index3 |
| 5 | PRACH resource index4 | PRACH resource index4 |
| 6 | PRACH resource index5 | PRACH resource index5 |
| 7 | PRACH resource index6 | Reserved |
| 8 | PRACH resource index7 | Reserved |
| 9 | PRACH resource index8 | Reserved |
| 10 | PRACH resource index9 | Reserved |
| 11 | All even-numbered PRACH opportunities in time region, first PRACH resource index in the sub-frame | All even-numbered PRACH opportunities in time region, first PRACH resource index in the sub-frame |
| 12 | All odd-numbered PRACH opportunities in time region, first PRACH resource index in the sub-frame | All odd-numbered PRACH opportunities in time region, first PRACH resource index in the sub-frame |
| 13 | Reserved | First PRACH resource index in the sub-frame |
| 14 | Reserved | Second PRACH resource index in the sub-frame |
| 15 | Reserved | Third PRACH resource index in the sub-frame |

The base station performs transmission rate matching according to a CCE aggregation level allocated to a PDCCH format (S915). The base station modulates coded data to generate modulated symbols (S920). The number of modulated symbols constituting one CCE may vary depending on the CCE aggregation level (one of 1, 2, 4, and 8). The base station maps the modulated symbols to a physical resource element corresponding to a user equipment-specific search space on the control region of a sub-frame positioned in the response window (S925). Accordingly, the RA-RNTI-scrambled PDCCH is transmitted to the user equipment on the provisional search space.

In case the base station operates based on cross-carrier scheduling, the provisional search space may be configured in various manners. The cross-carrier scheduling means scheduling when a PDCCH for downlink or uplink scheduling transmitted in a serving cell indicates a PDSCH transmitted in another serving cell. The serving cell where a PDCCH is transmitted is referred to as a scheduling serving cell, and a serving cell that is not the scheduling serving cell is referred to as a non-scheduling serving cell. When the base station operates based on the cross-carrier scheduling, a user equipment-specific search space may be configured according to the following embodiment.

Figure 10:
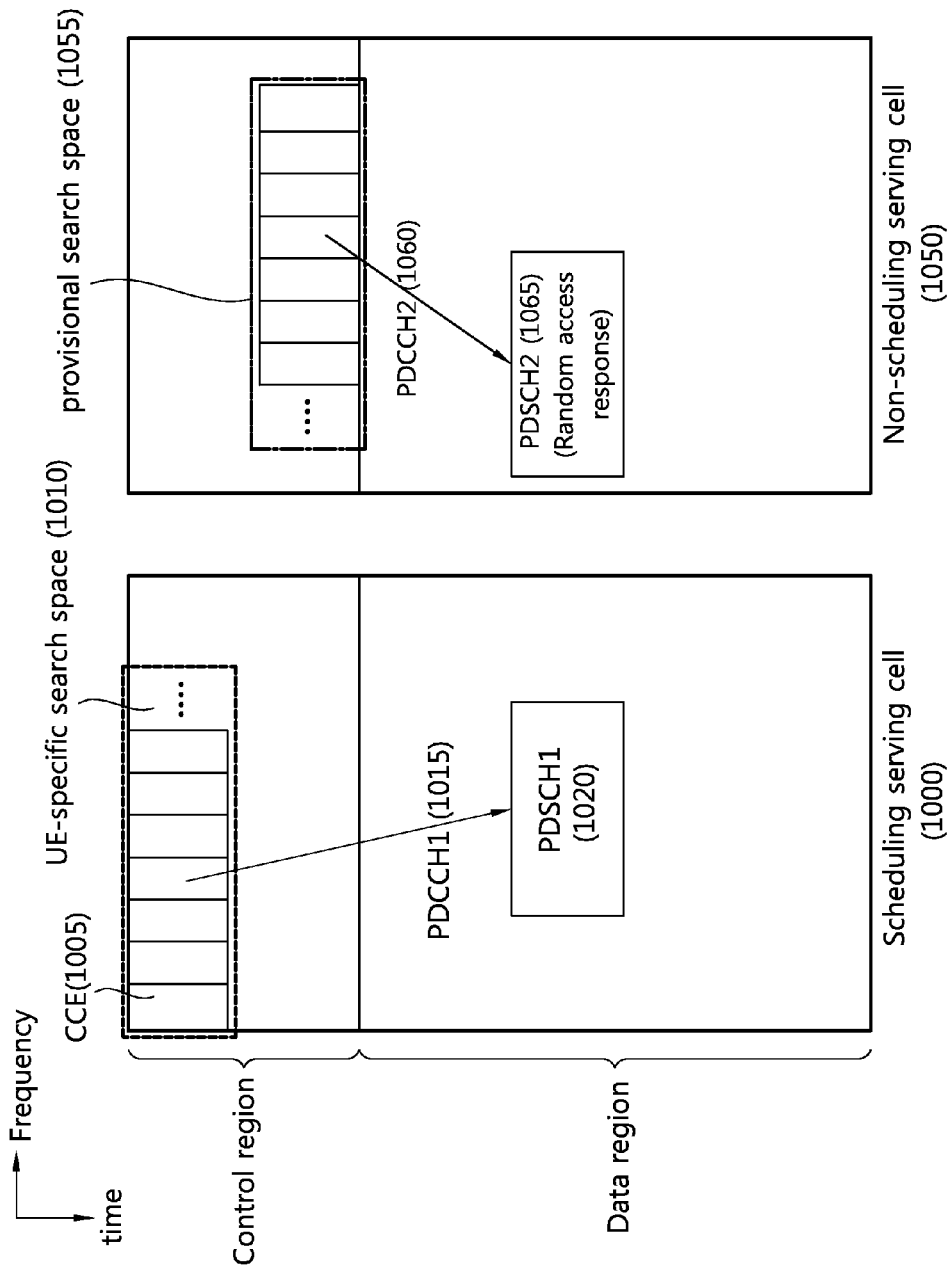
FIG. 10 shows an example of configuring a provisional search space according to an embodiment of the present invention.

By way of example, a user equipment-specific search space and a provisional search space are configured in the control regions of different scheduling serving cells from each other. For example, the user equipment-specific search space is configured in the control region of a scheduling serving cell, and the provisional search space is configured in the control region of a non-scheduling serving cell. The non-scheduling serving cell includes a secondary serving cell that has received a random access preamble from the user equipment. FIG. 10 shows an example of configuring a provisional search space according to an embodiment of the present invention. Referring to FIG. 10, a scheduling serving cell 1000 and a non-scheduling serving cell 1050 are configured in the user equipment. A user equipment-specific search space 1010 is configured in the control region of the scheduling serving cell 1000, and a provisional search space 1055 is configured in the control region of the non-scheduling serving cell 1050. The user equipment-specific search space 1010 and the provisional search space 1060 each include at least one CCE 1005. A PDCCH1 1015 and a PDCCH2 1060 in their respective search spaces schedule PDSCH1 1020 and PDSCH2 1065, respectively. Here, PDSCH2 1065 may include a random access response.

Figure 11:
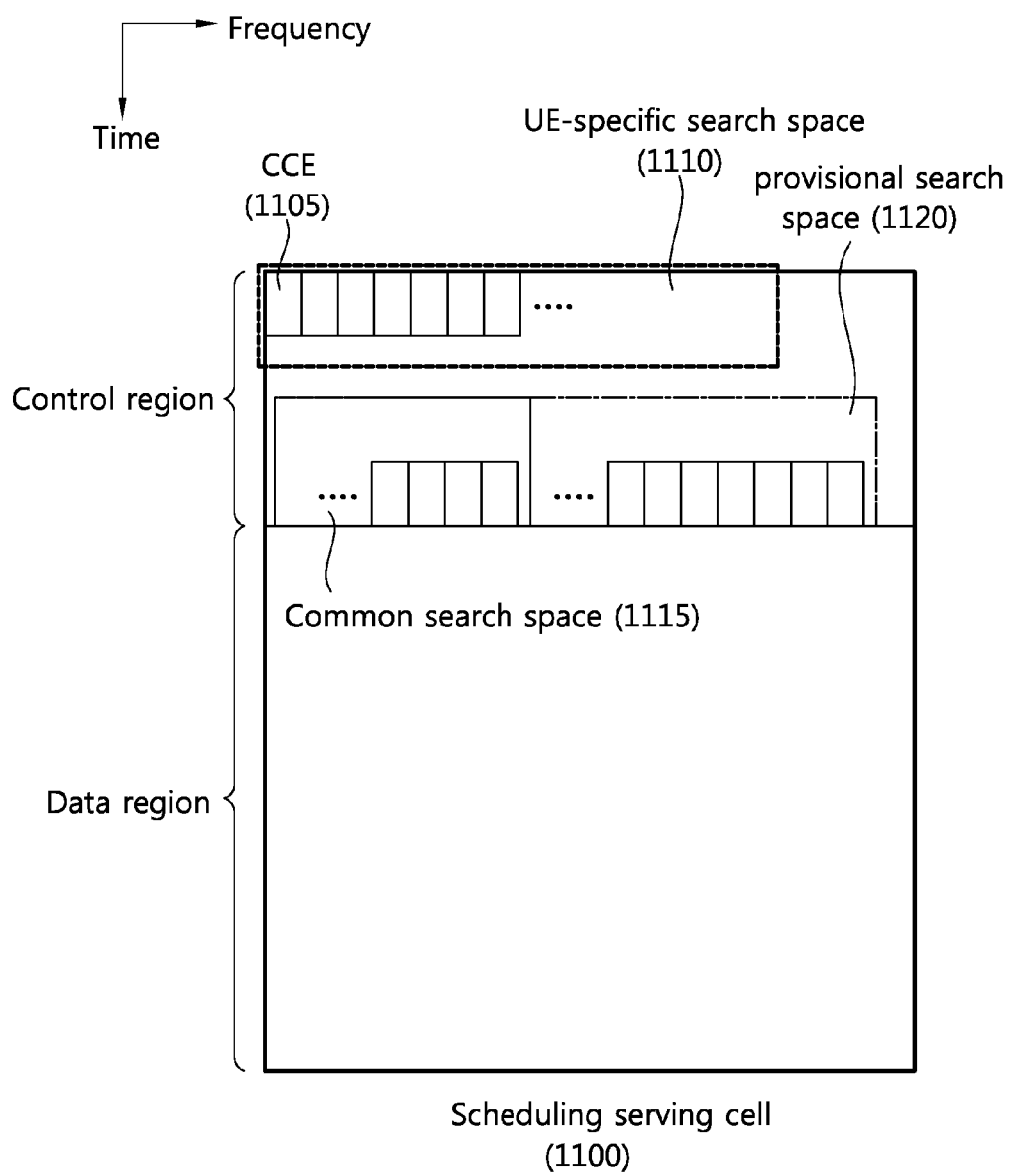
FIG. 11 shows an example of configuring a provisional search space according to another embodiment of the present invention.

As another example, a user equipment-specific search space, a common search space, and a provisional search space all are configured in the control region of a scheduling serving cell. This is the same as shown in FIG. 11. FIG. 11 shows an example of configuring a provisional search space according to another embodiment of the present invention. Referring to FIG. 11, a user equipment-specific search space 1110, a common search space 1115, and a provisional search space 1120 are distinguished from each other in the control region of a scheduling serving cell 1100.

The common search space 1115 and the provisional search space 1120 may be configured as follows:

1) The provisional search space 1120 may be configured in the scheduling serving cell 1100. For example, the provisional search spaces 1120 corresponding to their respective serving cells are configured in different locations from each other based on an offset according to a cell indicator field (CIF) value like the user equipment-specific search space 1110. Equation 3 may apply to a method of configuring the location of the provisional search space 1120.

$$S_{k,n}^{(L)} = L \cdot [(Y_k + n \cdot M^{(L)} + m) \bmod \lfloor N_{CCE,k}/L \rfloor] + i \quad \text{[Equation 3]}$$

Figure 12:
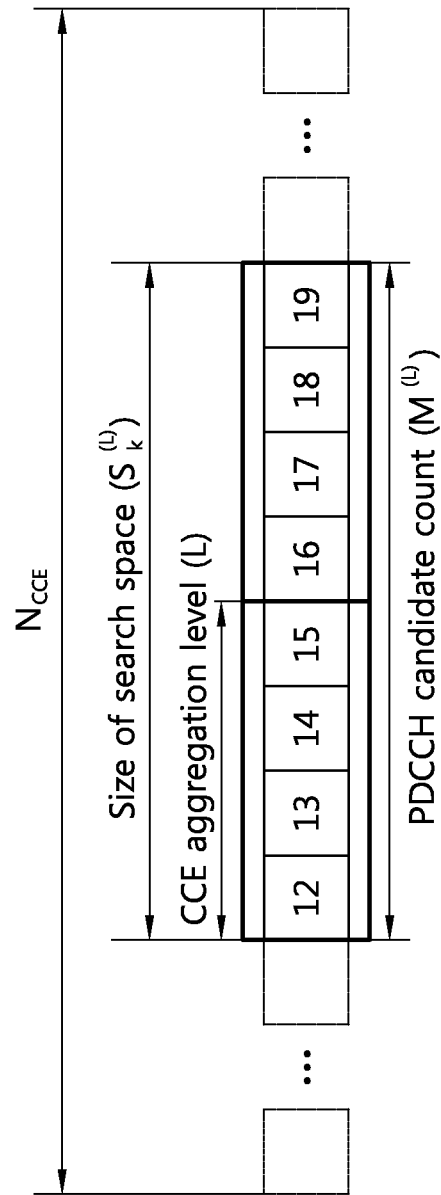
FIG. 12 shows an example of the configuration of a provisional search space in case L=4 according to the present invention.

Referring to FIG. 3, $S^{(L)}_{k,n}$ denotes the size of a search space, L is a CCE aggregation level, which is one of 1, 2, 4, and 8, n is Value of a CIF, $M^{(L)}$ is the number of PDCCH candidates, m is 0, . . . , $M^{(L)}-1$, $k=\lfloor n_s/2 \rfloor$, which is a sub-frame index from 0 to 9, $n_s$ is a slot number from 0 to 19, and i is 0, . . . , L−1. In case L=4, an example of the provisional search space 1100 configured is shown in FIG. 12.

Table 7 shows examples of search spaces. As shown in the table, the size (L) of CCE aggregation level and the number of PDCCH candidates ($M^{(L)}$) are given for the purpose of example, but is not limited thereto.

TABLE 7

| Type | Search space Aggregation level L [CCEs] | Size of search space [in CCEs] | PDCCH candidate count $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| common | 4 | 16 | 4 |
|  | 8 | 16 | 2 |
| provisional | 4 | 16 | 4 |
|  | 8 | 16 | 2 |

The user equipment-specific search space supports CCE aggregation level L∈{1,2,4,8}, and the common search space supports CCE aggregation level L∈{4,8}. The provisional search space, like the common search space, supports CCE aggregation level L∈[4,8]. Depending on the size of the CCE aggregation level and the number of PDCCH candidates, the size of the search space is determined. That is, the size of a search space is an integer multiple of the size of a CCE aggregation level or the number of PDCCH candidates.

Meanwhile, $Y_k$ is determined by Equation 4 in the case of the common search space 1115 and by Equation 5 in the case of the provisional search space 1120.

$$Y_k = 0, L \in \{4,8\} \quad \text{[Equation 4]}$$

$$Y_k = (A \cdot Y_{k-1}) \bmod D \quad \text{[Equation 5]}$$

Referring to Equation 5, A and D are constants, and $Y_{-n} = n_{RNTI} \neq 0$. The common search space 1115 is defined for allocating a control channel for data to be transmitted to multiple user equipments in a cell, and this is configured irrespective of an RNTI in a control region. In contrast, the provisional search space 1120 is configured in a control region in a secondary serving cell-specific manner. The location of the provisional search space 1120 positioned in a control region is determined by a hashing function.

In case the resource to be allocated to a control region lacks, in a system that may receive random access responses for multiple secondary serving cells at the same time, the provisional search spaces of the serving cells may overlap one another.

In case the resource to be allocated to a control region lacks, in a system that may receive random access responses for multiple secondary serving cells at the same time, the provisional search spaces of the serving cells may overlap one another.

Figure 13:
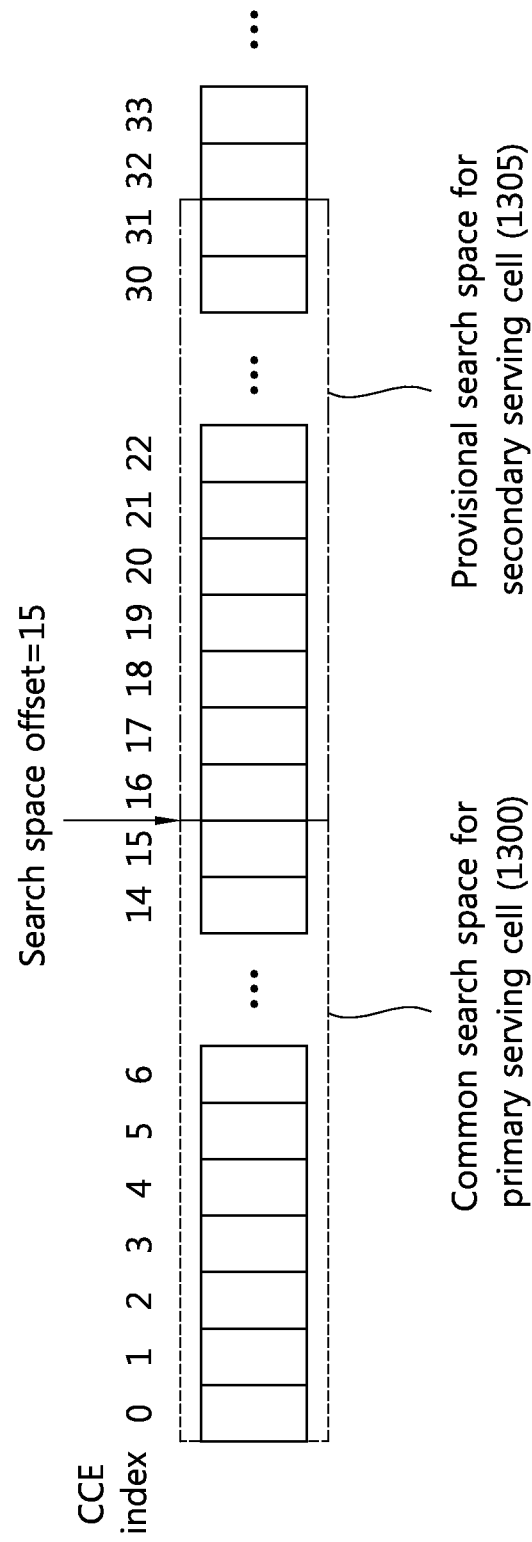
FIG. 13 is a view illustrating a method of identifying a provisional search space for each secondary serving cell according to the present invention.

2) In case the provisional search space 1120 is configured in a scheduling serving cell, the provisional search space 1120 of a secondary serving cell that is currently supposed to receive a random access response is configured to be contiguously positioned at a border of the common search space 1300 of a primary serving cell as shown in FIG. 13. In the example illustrated in FIG. 13, the search space offset is 15. In such case, although the serving cell where a random access response is transmitted is changed, CCEs having the same locations are allocated to the provisional search space 1120. However, even when the CCE aggregation level is varied, the range of CCEs for the provisional search space 1120 is not changed. For example, when CCE aggregation level=4, and PDCCH candidate count=4, the size of the provisional search space is 16, and when CCE aggregation level=8, and PDCCH candidate count=2, the size of the provisional search space is 16 as well. Meanwhile, the provisional search spaces of the respective serving cells may also be configured in different locations through a fixed search space offset.

In case the resource for transmitting a control channel lacks, the common search space of a primary serving cell may overlap the provisional search space of a secondary serving cell. For example, in a system designed not to be able to receive random access responses of multiple secondary serving cells at the same time, no provisional search space of the secondary serving cell can be configured or it is defined only for resources other than the common search space of the primary serving cell.

A random access procedure assumes that specific serving cells are configured in a user equipment and that each serving cell is in an activated state. Further, considering a time alignment group, procedures that should be first done are needed, and this will be described below with reference to FIG. 14.

Figure 14:
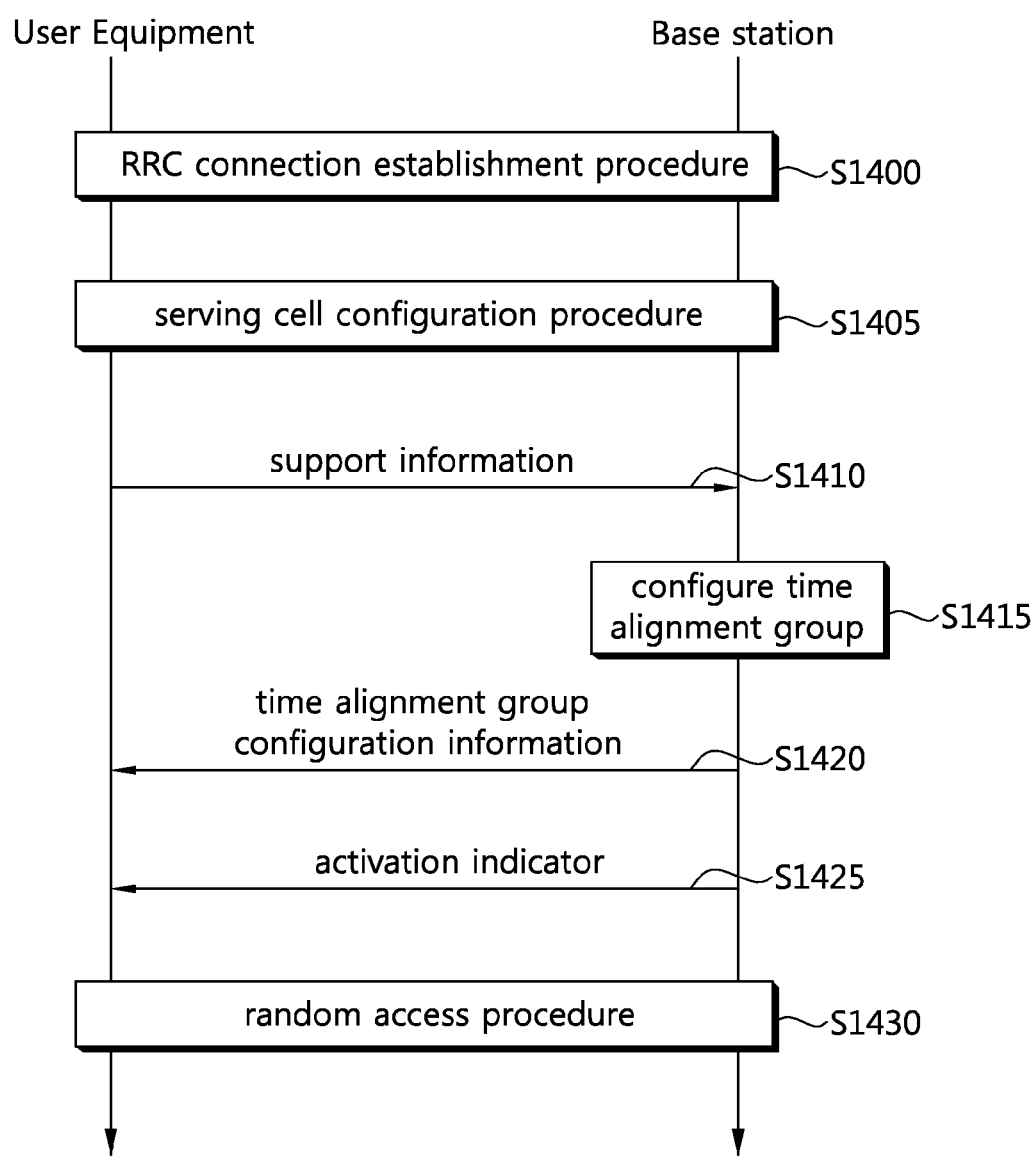
FIG. 14 is a flowchart illustrating a method of performing a random access procedure according to an embodiment of the present invention.

FIG. 14 is a flowchart illustrating a method of performing a random access procedure according to an embodiment of the present invention.

Referring to FIG. 14, the user equipment selects a cell for RRC connection before component carrier aggregation and performs an RRC connection establishment procedure to the base station through the selected cell in case user equipments that are in a RRC (Radio Resource Control) idle mode cannot aggregate component carriers while only user equipments that are in an RRC connected mode may perform component carrier aggregation (S1400). The RRC connection establishment procedure is done when the user equipment transmits an RRC connection request message to the base station, the base station transmits an RRC connection setup to the user equipment, and the user equipment transmits an RRC connection establishment complete message to the base station. The RRC connection establishment procedure includes configuring SRB1.

Meanwhile, a cell for RRC connection is selected based on the following selection requirements.

(i) A most suitable cell, on which the user equipment is to attempt RRC connection, may be selected based on information measured by the user equipment. As the measurement information, the user equipment considers both an RSRQ defined as a ratio of an RSRP value (denominator) for a specific cell relative of the whole received power (numerator) and an RSRP that measures received power based on a received CRS (cell-specific reference signal) of the specific cell. Accordingly, the user equipment secures both RSRP and RSRQ values for each distinguishable cell, and based on this, selects a proper cell. For example, a cell whose RSRP and RSRQ values each has a value more than 0 dB and which has the most RSRP value may be selected, a cell having the most RSRQ value may be selected, or a proper cell may be selected based on an average value considering a weight (for example, 7:3) set for each of the RSRP and RSRQ values.

(ii) RRC connection may be attempted using information on a service provider (PLMN) configured fixedly in the system which is stored in the user equipment's internal memory, downlink center frequency information, or cell differentiation information (for example, PCI (Physical cell ID)). The stored information may be configured of information on multiple service providers and cells, and a priority or priority weight may be set for each information.

(iii) The user equipment receives system information that has been transmitted from the base station through a broadcasting channel and may attempt a RRC connection by verifying information in the received system information. For example, the user equipment should verify whether a cell is a specific cell requiring a membership for cell connection (for example, CSG (closed subscribe group), non-allowed home base station, etc.). Accordingly, the user equipment receives system information transmitted from each base station and identifies CSG ID information that represents whether it is a CSG. If it is identified as a CSG, whether it is an accessible CSG is identified. To identify the accessibility, the user equipment may use its membership information and unique information of the CSG cell (for example, (E)CGI ((evolved) cell global ID) or PCI information) included in the system information). In case it is identified as an inaccessible base station through the verifying procedure, no RRC connection is attempted.

(iv) An RRC may be attempted through valid component carriers stored in the user equipment's internal memory (for example, component carriers configurable in the frequency band that may be supported by the user equipment over an implementation).

Among the above four requirements, (ii) and (iv) are selectively applied, but (i) and (iii) should be mandatorily applied.

In order to attempt an RRC connection through a cell selected for the RRC connection, the user equipment should identify an uplink band through which an RRC connection request message is to be sent. Accordingly, the user equipment receives system information through a broadcasting channel transmitted through downlink of the selected cell. SIB2 (system information block 2) includes center frequency information and bandwidth information on a band that is to be used for uplink. Accordingly, the user equipment attempts an RRC connection through a downlink of the selected cell and an uplink band that is connection established with the downlink through information in the SIB2. At this time, the user equipment may deliver an RRC connection request message to the base station as uplink data in the random access procedure. In case the RRC connection procedure succeeds, the RRC connection established cell may be called a primary serving cell, and the primary serving cell consists of a DL PCC and a UL PCC.

The base station, in case more radio resources need to be allocated to the user equipment according to the user equipment's request, or a network's request, or its own determination, performs an RRC connection reconfiguring procedure to configure one or more additional secondary serving cells (SCell) in the user equipment (S1405). The RRC connection reconfiguring procedure is performed by the base station transmitting an RRC connection reconfiguration message to the user equipment and the user equipment transmitting an RRC connection reconfiguration complete message to the base station.

The user equipment transmits assistant information to the base station (S1410). The assistant information provides information or a standard that is required to classify at least one serving cell configured in the user equipment into a time alignment group. For example, the assistant information may include at least one of the user equipment's geographical location information, the user equipment's neighbor cell measurement information, network deployment information, and serving cell configuration information. The user equipment's geographical location information indicates a location that may be represented with the user equipment's latitude, longitude, and height. The user equipment's neighbor cell measurement information includes received reference signal received power (RSRP) transmitted from a neighbor cell or reference signal received quality (RSRQ) of a reference signal. The network deployment information indicates the deployment of base stations, frequency selective repeaters (FSRs) or remote radio heads (RRHs). The serving cell configuration information is information regarding a serving cell configured in the user equipment. Step S1410 represents that the user equipment transmits the assistant information to the base station. However, the base station may be aware of the assistant information in a separate way or may already retain the assistant information. In such case, according to an embodiment of the present invention, random access may be performed with step S1410 omitted.

The base station configures a time alignment group by classifying serving cells (S1415). The serving cells may be classified or configured into each time alignment group according to assistant information. A time alignment group is a group including at least one serving cell, and the same time alignment value applies to each serving cell in the time alignment group. For example, if a first serving cell and a second serving cell belong to the same time alignment group TAG1, the first and second serving cells are applied with the same time alignment value TA1. In contrast, if the first and second serving cells belong to different time alignment groups TAG1 and TAG2, respectively, the first and second serving cells both are applied with different time alignment values TA1 and TA2, respectively. A time alignment group may include a primary serving cell, may include at least one secondary serving cell, or may include a primary serving cell and at least one secondary serving cell.

The base station transmits time alignment group configuration information to the user equipment (S1420). At least one serving cell configured in the user equipment is classified into a time alignment group. That is, the time alignment group configuration information describes the state in which the time alignment group is configured. As an example, the time alignment group configuration information may include a time alignment group count field, an index field for each time alignment group, and an index field of a serving cell included in each time alignment group, and these fields describe the state in which the time alignment group is configured.

As another example, the time alignment group configuration information may further include information on a representative serving cell in each time alignment group. The representative serving cell is a serving cell that may perform a random access procedure for maintaining and configuring uplink sync in each time alignment group. The representative serving cell may also be called a special serving cell (SCell) or reference serving cell (SCell). Unlike the above embodiment, in case the time alignment group configuration information does not include a representative serving cell, the user equipment may select a representative serving cell in each time alignment group on its own.

The base station, as necessary, transmits, to the user equipment, an activation indicator for activating or deactivating a specific serving cell among the serving cells configured in the user equipment (S1425). The user equipment performs an activation or deactivation operation on each serving cell based on the activation indicator.

The user equipment performs a random access procedure on the base station (S1430).

By way of example, in step S1430, the user equipment transmits a random access preamble on a representative serving cell designated based on the time alignment group configuration information, and after a TRAP passes, monitors a PDCCH for random access response in a provisional search space for a time corresponding to the response window. The random access response is configured in a provisional search space of the control region in the secondary serving cell (or the representative serving cell) where a random access procedure is to proceed. Here, the random access procedure on the secondary serving cell may be started when the base station orders the random access procedure to be performed. Information on ordering the random access procedure is non-contention based, but depending on the base station's intention, may also be performed on a contention basis.

As another example, step S1430 may be performed by the procedure shown in FIG. 6.

Figure 15:
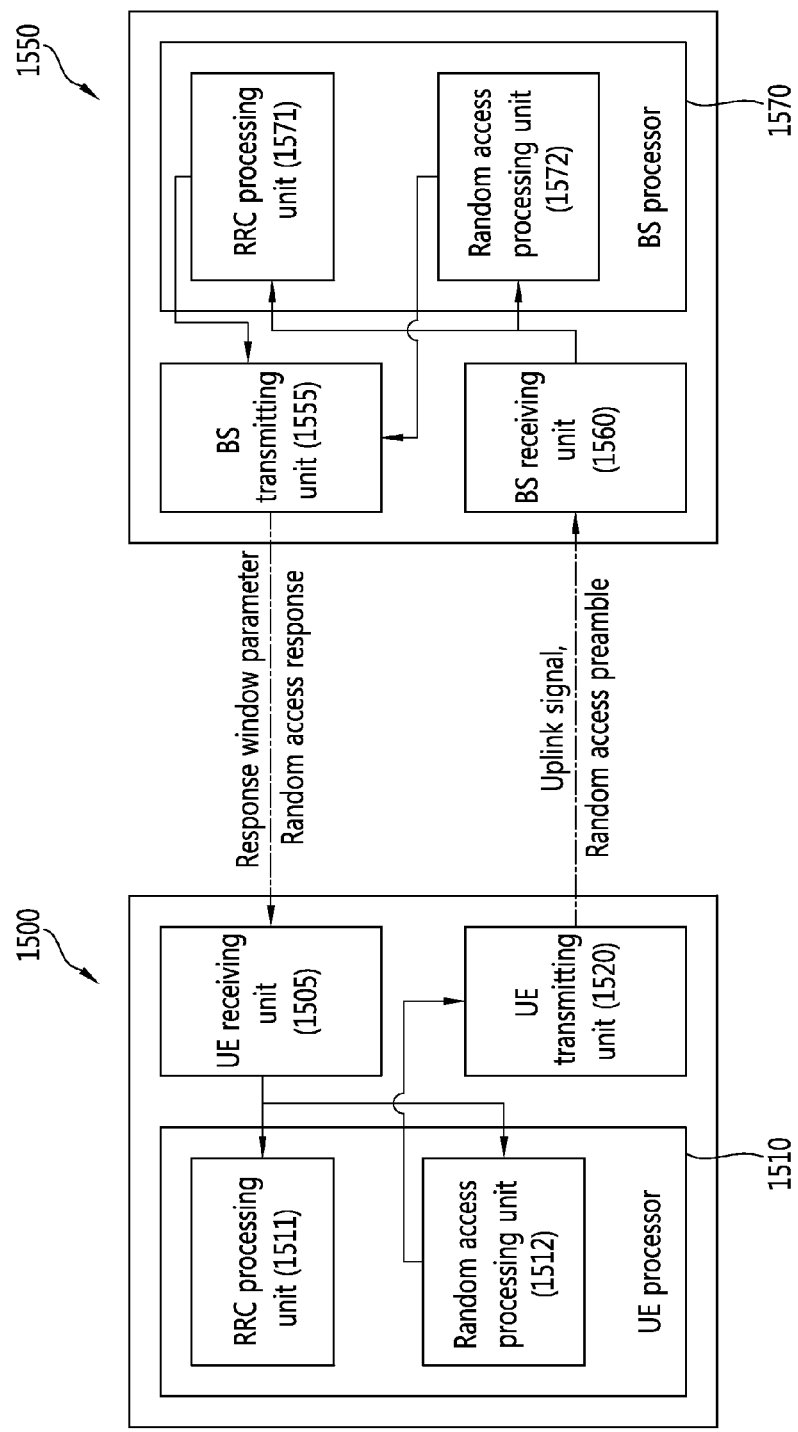
FIG. 15 is a block diagram illustrating a user equipment receiving a control channel and a base station transmitting a control channel according to the present invention.

FIG. 15 is a block diagram illustrating a user equipment that receives a control channel and a base station that transmits a control channel according to the present invention.

Referring to FIG. 15, the user equipment 1500 includes a user equipment receiving unit 1505, a user equipment processor 1510, and a user equipment transmitting unit 1520. The user equipment processor 1510 includes an RRC processing unit 1511 and a random access processing unit 1512.

The user equipment receiving unit 1505 receives a response window parameter, a PDCCH, or a random access response from a base station 1550. The response window parameter may be a message that is generated from a radio resource control (RRC) layer. Or, the response window parameter may be system information of a primary serving cell. For example, the response window parameter may include the position of a start sub-frame of a response window on a specific secondary serving cell and the length of the response window. The random access response includes a time advance command field, which indicates a time alignment value.

The RRC processing unit 1511 configures a response window where the random access processing unit 1512 monitors a random access response based on the response window parameter.

The user equipment receiving unit 1505 monitors a PDCCH for a random access response in a provisional search space configured in the control region of a secondary serving cell, a scheduling serving cell, or a non-scheduling serving cell for a time corresponding to the response window, a time of TRAP after a random access preamble has been transmitted. That is, the user equipment receiving unit 1505 includes CCEs and monitors, at a CCE aggregation level, an RA-RNTI-scrambled PDCCH in a search space configured in the secondary serving cell temporarily during a response window period. At this time, the user equipment receiving unit 1505 may determine the size of a provisional search space by multiplying the number of the physical downlink control channel candidates by the size of the CCE aggregation level.

The random access processing unit 1512 adjusts an uplink time of a secondary serving cell based on a time alignment value indicated by the time advance command field. By way of example, the random access processing unit 1512 may calculate a time to be adjusted using a time alignment value provided from the base station 1550 and may adjust the uplink time. The uplink time to be adjusted may be obtained based on Equation 1 or 2 above.

The user equipment transmitting unit 1520 transmits a random access preamble to the base station 1550 on a secondary serving cell. The random access preamble may be determined by the base station 1550 according to non-contention based random access or may be randomly obtained by the random access processing unit 1512 according to contention-based random access. Further, the user equipment transmitting unit 1520 transmits, to the base station 1550, an uplink signal such as a sounding reference signal (SRS) based on the uplink time adjusted by the random access processing unit 1512.

The base station 1550 includes a base station transmitting unit 1555, a base station receiving unit 1560, and a base station processor 1570. The base station processor 1570 includes an RRC processing unit 1571 and a random access processing unit 1572.

The base station transmitting unit 1555 configures a PDCCH for random access response. For example, configuring the PDCCH may be performed by the following procedure. The base station transmitting unit 1555 adds a cyclic redundancy check (CRC) for error detection to a DCI that intends to be sent to the user equipment 1500. The base station transmitting unit 1555 scrambles an RA-RNTI, which is an identifier indicating a random access response to the user equipment 1500, into the CRC. The base station transmitting unit 1555 performs channel coding on the RA-RNTI-scrambled DCI to thereby generate coded data. The base station transmitting unit 1555 performs transmission rate matching according a CCE aggregation level allocated to the PDCCH format. The base station transmitting unit 1555 generates modulated symbols by modulating the coded data. The base station transmitting unit 1555 maps the modulated symbols to a physical resource element corresponding to a provisional search space in the control region within a response window.

Thereafter, the base station transmitting unit 1555 transmits a PDCCH for random access response to the user equipment 1500 through a provisional search space in the control region of a secondary serving cell. At this time, the base station transmitting unit 1555 may adjust the transmission timing so that the user equipment may receive the PDCCH for random access response in the response window period.

In other words, the base station transmitting unit 1555 generates a PDCCH by scrambling an RA-RNTI identified as a random access preamble into the CRC of the downlink control information (DCI) and transmits the PDCCH to the user equipment at a CCE aggregation level given to the user equipment in a search space that includes at least one CCE and that is provisionally configured in the secondary serving cell during the response window period.

In case the base station 1550 operates based on cross-carrier scheduling, the base station transmitting unit 1555 may configure the provisional search space in various manners. By way of example, the base station transmitting unit 1555 configures a user equipment-specific search space and a provisional search space in the control regions of different serving cells from each other. As another example, the base station transmitting unit 1555 configures all of a user equipment-specific search space, a common search space, and a provisional search space in the control region of a scheduling serving cell. In case the resource for transmitting a control channel is insufficient, the common search space of the primary serving cell may overlap the provisional search space of the secondary serving cell. For example, in a system designed not to be able to receive random access responses for multiple secondary serving cells at the same time, the base station transmitting unit 1555 cannot configure a provisional search space of a secondary serving cell or defines only the resource other than the common search space of the primary serving cell. Further, the base station transmitting unit 1555 may configure the size of a provisional search space by multiplying the number of PDCCH candidates by the size of the CCE aggregation level. Further, the base station transmitting unit 1555 may configure a CCE aggregation level with four or eight CCEs.

The base station transmitting unit 1555 transmits a random access response indicated by a PDCCH to the user equipment 1500 through a data region (S620). For example, the random access response is transmitted to the user equipment 1500 through a PDSCH. The random access response includes a time advance command field.

The base station receiving unit 1560 receives a random access preamble from the user equipment 1500 on a secondary serving cell. Further, the base station receiving unit 1560 receives an uplink signal transmitted based on a uplink time adjusted by the random access processing unit 1512.

The RRC processing unit 1571 configures a response window parameter and generates as a radio resource control (RRC) message. For example, the response window parameter may include the position of a response window for a specific secondary serving cell in a start sub-frame and the length of the response window.

The random access processing unit 1572 generates a random access response corresponding to a random access preamble from the user equipment 1500. The random access response includes a time advance command field for uplink sync of the user equipment 1500, uplink radio resource allocation information, a random access preamble identifier for identifying user equipments performing random access, information on a time slot when a random access preamble of the user equipment 1500 is received, and an identifier such as a provisional C-RNTI. The random access preamble identifier is provided for identifying a received random access preamble.

Although embodiments of the present invention have been described, it will be understood by those skilled in the art that various changes or modifications can be made thereto without departing from the essential features of the present invention. Accordingly, the embodiments disclosed herein should not be construed as limiting the technical spirit of the present invention and as limited thereto. The scope of the present invention should be interpreted by the following claims, and all the technical spirit in the equivalents of the present invention should be interpreted as included in the scope of the present invention.

What is claimed is:

1. A method of receiving a control channel by a user equipment in a multi-component carrier system, the method comprising:
    transmitting a random access preamble to a base station on a secondary serving cell;
    monitoring, at a control channel element (CCE) aggregation level, a random access-radio network temporary identifier (RA-RNTI)-scrambled physical downlink control channel in a search space, which includes CCEs and is provisionally configured in the secondary serving cell during a response window period;
    receiving a random access response using the RA-RNTI-scrambled physical downlink control channel; and
    adjusting an uplink time of the secondary serving cell based on a time advance command (TAC) included in the random access response,
    wherein the size of the search space is equal to a value obtained by multiplying the number of candidates for the physical downlink control channel by the size of the CCE aggregation level.

2. The method of claim 1, further comprising receiving, from the base station, a radio resource control (RRC) message including a configuration parameter for the response window.

3. The method of claim 1, wherein the CCE aggregation level is four or eight control channel elements.

4. The method of claim 1, further comprising receiving, from the base station, system information of a primary serving cell including a configuration parameter for the response window.

5. A method of transmitting a control channel by a base station in a multi-component carrier system, the method comprising:
    receiving a random access preamble, from a user equipment, on a secondary serving cell;
    generating a physical downlink control channel by scrambling a random access-radio network temporary identifier (RA-RNTI) identified by the random access preamble with a cyclic redundancy check (CRC) of downlink control information (DCI);
    transmitting, to the user equipment, the physical downlink control channel at a control channel element (CCE) aggregation level given to the user equipment in a search space, which includes at least one CCE and is provisionally configured in the secondary serving cell during a response window period; and
    transmitting a random access response indicated by the physical downlink control channel to the user equipment,
    wherein the size of the search space is equal to a value obtained by multiplying the number of candidates for the physical downlink control channel by the size of the CCE aggregation level.

6. The method of claim 5, further comprising transmitting, to the user equipment, a radio resource control message including a configuration parameter for the response window.

7. The method of claim 5, further comprising transmitting, to the user equipment, system information of a primary serving cell including a configuration parameter for the response window.

8. The method of claim 5, wherein the CCE aggregation level is four or eight control channel elements.

9. A user equipment to receive a control channel in a multi-component carrier system, the user equipment comprising:
    a user equipment transmitting unit configured to transmit a random access preamble to a base station on a secondary serving cell;
    a user equipment receiving unit configured to monitor, at a control channel element (CCE) aggregation level, a random access-radio network temporary identifier (RA-RNTI)-scrambled physical downlink control channel in a search space, which includes control channel elements (CCEs) and is provisionally configured in the secondary serving cell during a response window period, and to receive a random access response using the RA-RNTI-scrambled physical downlink control channel; and
    a random access processing unit configured to adjust an uplink time of the secondary serving cell based on a time advance command (TAC) included in the random access response,
    wherein the user equipment receiving unit determines the size of the search space as a value obtained by multiplying the number of candidates for the physical downlink control channel by the size of the CCE aggregation level.

10. The user equipment of claim 9, wherein the user equipment receiving unit receives, from the base station, a radio resource control (RRC) message including a configuration parameter for the response window.

11. The user equipment of claim 9, wherein the user equipment receiving unit monitors the RA-RNTI-scrambled physical downlink control channel by limiting the CCE aggregation level to four or eight control channel elements.

12. The user equipment of claim 9, wherein the user equipment receiving unit receives, from the base station, system information of a primary serving cell including a configuration parameter for the response window.

13. A base station to transmit a control channel in a multi-component carrier system, the base station comprising:
    a base station receiving unit configured to receive a random access preamble, from a user equipment, on a secondary serving cell;
    a random access processing unit configured to generate a random access response including a time advance command (TAC) used for adjusting an uplink time in the secondary serving cell as a response to the random access preamble; and a base station transmitting unit configured to generate a physical downlink control channel by scrambling a random access-radio network temporary identifier (RA-RNTI) identified with the random access preamble into a cyclic redundancy check (CRC) of downlink control information (DCI), to transmit, to the user equipment, the physical downlink control channel at a control channel element (CCE) aggregation level given to the user equipment in a search space, which includes at least one CCE and is provisionally configured in the secondary serving cell during a response window period, and to transmit a random access response indicated by the physical downlink control channel to the user equipment, wherein the base station transmitting unit determines the size of the search space as a value obtained by multiplying the number of candidates for the physical downlink control channel by the size of the CCE aggregation level.

14. The base station of claim 13, further comprising a radio resource control (RRC) processing unit to generate a radio resource control message including a configuration parameter for the response window.

15. The base station of claim 13, further comprising a radio resource control (RRC) processing unit to generate system information of a primary serving cell including a configuration parameter for the response window.

16. The base station of claim 13, wherein the base station transmitting unit configures the CCE aggregation level of four or eight control channel elements.

* * * * *